(12) United States Patent
Araki et al.

(10) Patent No.: US 8,915,636 B2
(45) Date of Patent: Dec. 23, 2014

(54) FLAT PANEL LIGHTING DEVICE AND RETROFIT KIT

(75) Inventors: John Araki, Tustin, CA (US); J. Richard Myers, Pasadena, CA (US)

(73) Assignee: Pixi Lighting, Inc., Orange, CA (US)

( * ) Notice: Subject to any disclaimer, the term of this patent is extended or adjusted under 35 U.S.C. 154(b) by 68 days.

(21) Appl. No.: 13/473,918

(22) Filed: May 17, 2012

(65) Prior Publication Data

US 2013/0044512 A1   Feb. 21, 2013

Related U.S. Application Data

(60) Provisional application No. 61/487,253, filed on May 17, 2011, provisional application No. 61/579,472, filed on Dec. 22, 2011.

(51) Int. Cl.

| | |
|---|---|
| *F21S 8/00* | (2006.01) |
| *F21V 7/04* | (2006.01) |
| *F21V 15/01* | (2006.01) |
| *F21V 23/00* | (2006.01) |
| *H05B 33/08* | (2006.01) |
| *F21Y 101/02* | (2006.01) |
| *F21Y 105/00* | (2006.01) |
| *F21S 8/04* | (2006.01) |
| *F21V 8/00* | (2006.01) |

(52) U.S. Cl.
CPC ........... *F21V 23/003* (2013.01); *F21Y 2101/02* (2013.01); *Y02B 20/386* (2013.01); *F21Y 2105/001* (2013.01); *F21V 15/01* (2013.01); *F21S 8/04* (2013.01); *F21V 23/002* (2013.01); *H05B 33/0857* (2013.01); *G02B 6/0068* (2013.01); *G02B 6/0091* (2013.01); *G02B 6/0083* (2013.01); *G02B 6/0085* (2013.01); *G02B 6/0073* (2013.01); *Y02B 20/383* (2013.01)

USPC ........... 362/612; 362/632; 362/634; 362/147; 362/150

(58) Field of Classification Search
USPC ........................ 362/600–634, 648, 147, 150; 349/58–67
See application file for complete search history.

(56) References Cited

U.S. PATENT DOCUMENTS

| | | |
|---|---|---|
| 3,892,959 A | 7/1975 | Pulles |
| 5,027,258 A | 6/1991 | Schoniger |

(Continued)

FOREIGN PATENT DOCUMENTS

| | | |
|---|---|---|
| CN | 201225561 | 4/2009 |
| CN | 201513783 | 6/2010 |

(Continued)

OTHER PUBLICATIONS

ATG Electronics Corp., "iBright Flat LED Panel", website description, undated; downloaded from http://www.atgelectronics.com/lighting/Illumination/LEDTroffer/Flat-LED-Panel.html on Apr. 25, 2013; 9 pages.

(Continued)

*Primary Examiner* — David J Makiya
(74) *Attorney, Agent, or Firm* — Lawrence N. Ginsberg

(57) ABSTRACT

The present application is directed to a light fixture and associated retrofit lighting kit that includes a substantially flat light emitting diode panel. The light fixture can be employed in a variety of applications, including installation as a standalone fixture, a replacement for a fluorescent lighting unit and as a retrofit lighting kit to be used in connection with an existing fluorescent lighting unit.

10 Claims, 39 Drawing Sheets

(56) References Cited

U.S. PATENT DOCUMENTS

| | | | |
|---|---|---|---|
| 5,276,591 A | 1/1994 | Hegarty | |
| 5,375,043 A | 12/1994 | Tokunaga | |
| 5,636,462 A * | 6/1997 | Kleiman | 40/452 |
| 5,641,219 A | 6/1997 | Mizobe | |
| 6,042,243 A * | 3/2000 | Grill et al. | 362/125 |
| 6,095,660 A | 8/2000 | Moriyama | |
| 6,231,213 B1 * | 5/2001 | Schmidt et al. | 362/374 |
| 6,641,283 B1 | 11/2003 | Bohler | |
| 6,739,734 B1 * | 5/2004 | Hulgan | 362/243 |
| 6,758,573 B1 | 7/2004 | Thomas | |
| 6,880,963 B2 * | 4/2005 | Luig et al. | 362/560 |
| 6,997,576 B1 * | 2/2006 | Lodhie et al. | 362/240 |
| 7,172,324 B2 | 2/2007 | Wu | |
| 7,374,327 B2 | 5/2008 | Schexnaider | |
| 7,445,369 B2 * | 11/2008 | Yu et al. | 362/612 |
| 7,448,768 B2 * | 11/2008 | Sloan et al. | 362/145 |
| 7,473,022 B2 | 1/2009 | Yoo | |
| 7,547,112 B2 * | 6/2009 | Kim | 362/148 |
| 7,563,015 B2 | 7/2009 | Tzung-Shiun | |
| 7,570,313 B2 * | 8/2009 | Wu et al. | 349/58 |
| 7,583,901 B2 | 9/2009 | Nakagawa | |
| 7,604,389 B2 | 10/2009 | Sakai | |
| 7,722,221 B2 * | 5/2010 | Chae | 362/294 |
| 7,726,617 B2 * | 6/2010 | Zambelli et al. | 248/288.31 |
| 7,766,536 B2 * | 8/2010 | Peifer et al. | 362/633 |
| 7,894,013 B2 * | 2/2011 | Chung et al. | 349/58 |
| 7,918,598 B2 * | 4/2011 | Peifer et al. | 362/612 |
| 8,029,293 B2 * | 10/2011 | Janos et al. | 439/76.1 |
| 8,061,867 B2 | 11/2011 | Kim | |
| D653,376 S | 1/2012 | Kong | |
| 8,092,034 B2 | 1/2012 | Zarian | |
| 8,092,069 B2 * | 1/2012 | Chuang et al. | 362/633 |
| 8,096,671 B1 * | 1/2012 | Cronk et al. | 362/147 |
| 8,136,958 B2 * | 3/2012 | Verfuerth et al. | 362/221 |
| 8,167,627 B1 | 5/2012 | Janos | |
| 2004/0240230 A1 | 12/2004 | Kitajima | |
| 2005/0082453 A1 * | 4/2005 | Chuang | 248/300 |
| 2005/0174755 A1 * | 8/2005 | Becker | 362/133 |
| 2006/0022214 A1 | 2/2006 | Morgan | |
| 2006/0158906 A1 * | 7/2006 | Parker | 362/634 |
| 2006/0291238 A1 | 12/2006 | Epstein | |
| 2007/0047262 A1 | 3/2007 | Schardt | |
| 2007/0097227 A1 | 5/2007 | Toyokawa | |
| 2007/0115402 A1 * | 5/2007 | Zhang et al. | 349/60 |
| 2007/0171670 A1 | 7/2007 | Zagar | |
| 2007/0222914 A1 * | 9/2007 | Kotchick et al. | 349/61 |
| 2007/0247414 A1 | 10/2007 | Roberts | |
| 2007/0247842 A1 | 10/2007 | Zampini | |
| 2007/0247870 A1 * | 10/2007 | Sakai et al. | 362/612 |
| 2008/0013303 A1 | 1/2008 | Guarino | |
| 2009/0097277 A1 | 4/2009 | Iwasaki | |
| 2009/0323334 A1 * | 12/2009 | Roberts et al. | 362/247 |
| 2010/0171145 A1 | 7/2010 | Morgan | |
| 2010/0172138 A1 | 7/2010 | Richardson | |
| 2010/0176742 A1 | 7/2010 | Lee | |
| 2010/0237798 A1 * | 9/2010 | Wolf et al. | 315/294 |
| 2010/0284185 A1 | 11/2010 | Ngai | |
| 2010/0289428 A1 | 11/2010 | Frazier | |
| 2011/0068708 A1 * | 3/2011 | Coplin et al. | 315/294 |
| 2012/0081889 A1 * | 4/2012 | Frost et al. | 362/184 |
| 2012/0091919 A1 | 4/2012 | Tveit | |
| 2012/0182733 A1 * | 7/2012 | Cho | 362/235 |
| 2012/0218746 A1 | 8/2012 | Winton | |
| 2012/0287631 A1 * | 11/2012 | Sheng | 362/235 |
| 2012/0328242 A1 | 12/2012 | Hesse | |

FOREIGN PATENT DOCUMENTS

| | | |
|---|---|---|
| CN | 201724032 | 1/2011 |
| DE | 202009007334 | 9/2009 |
| DE | 102010006465 A1 | 8/2011 |
| DE | 202012103430 U1 | 9/2012 |
| EP | 1906081 | 4/2008 |
| EP | 2088835 | 8/2009 |
| EP | 2131100 | 12/2009 |
| EP | 2270387 B1 | 9/2011 |
| JP | 2004271734 | 9/2004 |
| JP | 2004335426 | 11/2004 |
| JP | 2006106212 | 4/2006 |
| WO | WO 2010133535 A1 * | 11/2010 |
| WO | 2012125605 A3 | 9/2012 |

OTHER PUBLICATIONS

Delta Electronics, "General Lighting: LED Lighting Solutions", product brochure, undated; downloaded from http://www.delta.com.tw/product/rd/led/products/luminaire/lum_fl01.asp on Mar. 30, 2012; 2 pages.

Dongbu Lightec, "LED Light Panel Installation Guide", undated; downloaded from http://www.dongbulightec.ca/English/Products/LED_L_P_Tech.html on Mar. 30, 2012; 5 pages.

Dongbu Lightec, "LumiSheet Lamp", pamphlet from LIGHTFAIR International (LFI) on Apr. 23-25, 2013; 9 pages.

ELumination, "Custom LED Light Panels", undated; downloaded from www.elumanation.com on Dec. 4, 2012; 1 page.

Energetic Lighting, "LED Panel Light", product features for ELEP2x250 and ELEP2x450, undated; downloaded from www.energeticlighting.com on Mar. 30, 2012; 1 page.

Enlight Corporation, "Ultraslim LED Panel Light", website description, undated; downloaded from http://twe.enlightcorp.com/ on Apr. 25, 2013; 2 pages.

Foshan Sunbay Opto Electronics Co., Ltd., "Super Thin and Driver Inside 300*300 22W LED Panel Light", undated; originally downloaded from http://sunbayled.en.made-in-china.com/product/vBxnWSXobmhY/China-Super-Thin-and-Driver-Inside-300-300-22W-LED-Panel-Light.html on Apr. 20, 2013; 3 pages.

GE Lighting Solutions, "GE Lighting Flat LED Panel", undated; downloaded on Jan. 16, 2012; 10 pages.

GE Lighting Solutions, "Lumination LED Luminaires—Troffer", undated; downloaded from http:/www.gelightingsolutions.com/Indoor/id-456789e/Lumination_LED_Luminaires_-_Troffer on Jul. 12, 2012; 2 pages.

GE Lighting Solutions, specification sheet for the 2x2 Edgelighting Fixture for troffer fixtures, pamphlet from LIGHTFAIR International (LFI) on May 17-19, 2011; 1 page.

General Lighting Electronic Co., Ltd, LED Panel Light specifications for 60w 600x600, undated; originally downloaded from http://www.gl-leds.com/led-news/led-panel-light-60w-600x600-01.html on Jun. 6, 2011; 3 pages.

General Lighting Electronic Co., "LED Light Panel List", undated; originally downloaded from http://www.gl-leds.com/led-panel-light-list.html on Apr. 23, 2013; 2 pages.

Global Lighting Technologies Inc., "LED Edge Lighting", pamphlet from LIGHTFAIR International (LFI) on Apr. 23-25, 2013; 12 pages.

Green Led Lighting Solutions Inc., "LED Light Panel: Ultra Thin LED Light Box (Built in Power Supply)", product brochure, undated; downloaded from www.ledlightpanel.com on Apr. 23, 2013; 1 page.

Intematix Corporation, "Customer Case Study—Tech Lighting Unilume: Innovation for Undercabinet Lighting", brochure of Intematix for its Intematix ChromaLit™ remote phosphor LEDs technology, undated; downloaded from www.intematix.com on Mar. 19, 3013; 2 pages.

Luminousfilm.com, a Knema, LLC company, "LED Light Panels Information", website description, undated; originally downloaded from http://www.luminousfilm.com/led.htm on Mar. 19, 2013; 5 pages.

Maxim Lighting; website description of LED flat lights, undated; originally downloaded from http://www.maximlighting.com/ on Mar. 19, 2013; 2 pages.

Maxim Lighting, "CounterMax StarStrand Counter, Accent & Task Lighting Solutions", copyright 2012; originally downloaded from http://www.maximlighting.com/catalog_pdf.aspx?c=brochure&n=LMXBRO1203.pdf on Mar. 19, 2013; pp. 1-5, 11-14; 10 pages.

Maxlite, specification sheet for 2x4 flat light, pamphlet from LIGHTFAIR International (LFI) on May 17-19, 2011; 1 page.

(56) References Cited

OTHER PUBLICATIONS

Maxlite, advertisement for maxLED Flat Panel 2x2, 2x4, and 1x4 models, for LIGHTFAIR International (LFI) on May 17-19, 2011; 5 pages.
Modular International Inc., "LED Panels", product brochure, undated; downloaded from http://www.modularinternational.com/literature.php on Mar. 6, 2009; 2 pages.
National Specialty Lighting, "LED Task Star", product brochure, undated; downloaded from http://www.nslusa.com/ on Mar. 19, 2013; 1 page.
Nicor Lighting, "T2LED 2x2 Troffer", product brochure, undated; downloaded from nicorlighting.com/uploads/.../t2-led-2x2-troffer-lumen-mainenance.pdf on Apr. 25, 2013; 1 page.
Nicor Lighting, "2013 Catalog Multifamily, Assisted Living, & Hospitality Lighting Products", copyright 2013, pamphlet from LIGHTFAIR International (LFI) on Apr. 23-25, 2013; pp. 1-4, 31; 7 pages.
Noke LED Lighting Technology Co., Ltd., "Ceiling Light 650x650mm", website description, undated; originally downloaded from http://www.nokeled.com/products/Ceiling-light-650x650mm.html on Jun. 11, 2012; 2 pages.
Patent Cooperation Treaty, "Invitation to Pay Additional Fees and, Where Applicable, Protest Fee", partial international search report for international application No. PCT/US2012/038338, mailed Sep. 19, 2012; 7 pages.
Patent Cooperation Treaty, "International Search Report", international search report for international application No. PCT/US2012/038338, Feb. 18, 2013; 7 pages.
Patent Cooperation Treaty, "Invitation to Pay Additional Fees and, Where Applicable, Protest Fee", partial international search report for international application No. PCT/US2012/038315, mailed Sep. 19, 2012; 9 pages.
Patent Cooperation Treaty, "International Search Report", international search report for international application No. PCT/US2012/038315, Feb. 13, 2013; 9 pages.
Rambus, "LED Light Bulbs", website description, Jan. 17, 2013; originally downloaded from http://www.rambus.com/us/technology/solutions/led-light-bulb/index.html?utm_source=Rambus+Contacts&utm_campaign=99dc5a0773-Technology_Bulb_Imerz_Launch1_17_2013&utm_medium=email on Feb. 12, 2013; 2 pages.
Shenzhen Borsche Electronic Co., Ltd., "LED Panel Light", product catalog, undated; originally downloaded from http://cnhidee.en.made-in-china.com/product-group/pqeQkYCcXtVK/LED-Panel-Light-catalog-1.html on Apr. 30, 2013; 3 pages.
Stellaray Technology Limited, "Flat LED Panel", published Mar. 19, 2012; downloaded from http://www.srleds.com/e/products/LED_Panel_Lights/led_panel_lights.html on Apr. 12, 2012; 26 pages.
Taiwan T-Lux Technology Co., Ltd, "BTHx Series Specification Sheet", Issued Oct. 12, 2010 and Modified Mar. 1, 2011; downloaded from http://www.t-lux.com.tw on Nov. 2, 2011; 7 pages.
Tech Lighting, a Generation Brands Company, "Unilume LED Undercabinet", product brochure and installation instructions, undated; downloaded on www.techlighting.com on Mar. 19, 2013; 6 pages.
Unity Opto Technology Co., Ltd., "Product Specification: UNi Ceiling Lighting_12020", Jan. 7, 2011; downloaded from http://www.unityopto.com.tw/ on Mar. 19, 2013; 5 pages.
Unity Opto Technology Co., Ltd., "Product Specification: Ceiling Lighting_6060", Nov. 24, 2010; downloaded from http://www.unityopto.com.tw/ on Mar. 19, 2013; 4 pages.
Zenaro; "Axenia-Modul 600 40W", website description, undated; downloaded from http://europe.zenaro-led.com/en/products/europe/office-lights/itemlist/category/82-axenia on Jun. 22, 2012; 1 page.
Banq Technology Co., Ltd., "300*300 Second Generation LED Panel Light," website description, copyright 2013; downloaded from http://www.banqcn.com/product-141.html on Oct. 28, 2013; email received from website owner on Oct. 9, 2013; 6 pages.
BBF Hitech Intl Co., Ltd, "300x300x11mm," website description, copyright 2010; downloaded from http://www.bbfled.com/productshow_386.html on Oct. 28, 2013; email received from website owner on Sep. 7, 2013; 2 pages.
Bravoled Lighting Manufacturing Co., Limited, "Bravoled, BL-P6-10W ANS," website description, copyright 2010; downloaded from http://www.bravoled.com/html/prs0/t287-310/c565.html on Oct. 28, 2013; email received from website owner on Sep. 26, 2013; 2 pages.
Chinese CleanTech Components Company Ltd, CCTCC, "CTC-300/1200W," website description, undated; downloaded from http://www.cctcc-group.com/productShow.asp?PicID=967 on Oct. 28, 2013; email received from website owner on Sep. 11, 2013; 2 pages.
Ecolux Doubletree, "LED Integrate Super Flatlight," website description, copyright 2003; downloaded from www.ecolux.com.cn/aspcms/product/2013-4-20/292.html on Aug. 30, 2013; 2 pages.
General Electric Company, "GE Lighting E-Catalogue," product brochure, copyright 1997-2013; downloaded from http://catalog.gelighting.com/system/indoor-luminaires/recessed/lumination/?r=emea on Oct. 30, 2013; 4 pages.
General Electric Company, "Infusion LED Modules System," website description, copyright 1997-2013; downloaded from http://www.gelighting.com/LightingWeb/emea/products/highlights/infusion-led-module/overview/#3 on Aug. 8, 2013; 1 page.
Heeber Lighting Co., Ltd., "Heeber 600x600mm, 26w LED panel_Heeber," website description, copyright 2005; downloaded from http://www.heeber.com/cp/html/?5.html on Oct. 28, 2013; email received from website owner on Oct. 8, 2013; 3 pages.
Hilton Electrical Co., Ltd., "Hilton LED Products 2013 List," copyright 2009; Product list received by email from website owner on Aug. 13, 2013; 45 pages.
HK Raymates Electronic Co., Ltd, "RM-COB15/30W-W," website description, undated; downloaded from http://www.raymates.com/index.php/product/view/649.html on Oct. 28, 2013; email received from website owner on Sep. 11, 2013; 1 page.
Keyuan Optoelectronic Co., Ltd, "Your Present Position: Display, KYZM12060," website description, undated; downloaded from http://www.zs-keyuan.com/en/displayproduct.html?proID=3068225 on Oct. 28, 2013; email received from website owner on Sep. 2, 2013; 2 pages.
Kindom Opto-Electronic Co., Ltd., "300*300 LED Panel Light (side shine)," website description, copyright 2002-2009; downloaded from http://www.kindomled.com/eng/productsview.asp?id=205 on Oct. 28, 2013; email received from website owner on Sep. 9, 2013; 2 pages.
Lamptop Optoelectronics Tech Co., Ltd. "LED Panel Light-LampTop Optoelectronics Technology Co., Ltd," website description, copyright 2009-2013; downloaded from http://www.lamptopled.com/Product/5928161511.html on Sep. 25, 2013; email received from website owner on Sep. 5, 2013; 2 pages.
NGE Technology Limited, "Products Introduction: 300*300mm LED panel light," website description, copyright 2011; downloaded from http://www.nge-led.com/products/NGE-P0303-S18W/ on Oct. 28, 2013; email received from website owner on Sep. 17, 2013; 2 pages.
Ningbo KingsLED Electronics Co., Ltd, "LED ultrathin downlight & LED panel lighting," website description, undated; brochure and email from website owner sent on Jul. 30, 2013; 4 pages.
Ningbo Yoogir Energy Saving Technology Co., Ltd, "LED PL Lamp, LED PLAC, LED Plug Light, LED PL Light, LED Panel Light, LED Tube," website description, copyright 2003-2013; downloaded from http://www.yoogir.com/HK-PL6060.html on Oct. 24, 2013; email received from website owner on Oct. 17, 2013; 2 pages.
Senseled Technology Co., Limited, "RGB Wall & Ceiling & Dance Floor Pannel," website description, undated; downloaded from http://www.senseled.com/product-detail.asp?Product_Id=138&Big_Class_id=93; downloaded from website owner on Oct. 29, 2013; email received from website owner on Oct. 10, 2013; 1 page.
Shanghai Goodsun Lighting Co. Ltd, "A. Ultrathin LED Panel Light 600mm*600mm," website description, copyright 2011-2012; downloaded from http://www.shgoodsun.com/led-panel-light-600-600.html on Oct. 24, 2013; email received from website owner on Oct. 18, 2013; 3 pages.
Shenzhen Aoser Lighting, "SMD2835 led panel light," website description, copyright 2010; downloaded from http://www.aoserled.

(56) References Cited

OTHER PUBLICATIONS com/en/Products_detail.asp?ID=326 on Oct. 28, 2013; email received from website owner on Aug. 2, 2013; 2 pages.
Shenzhen Banq Technology Co., "600*600 front lighting led panel light_Shenzhen Bang Technology Co., Ltd," website description, copyright 2013; downloaded from http://www.banqcn.com/product-139.html on Oct. 28, 2013; email received from website owner on Aug. 5, 2013; 6 pages.
Shenzhen Boyao Optoelectronic Technology Co., Ltd, "Shenzhen Boyao Optoelectronic Technology Co., Ltd.—LED High Bay Light, LED Panel Light," website description, copyright 1999-2013, downloaded from boyao-tech.en.alibaba.com on Sep. 9, 2013; email received from website owner on Aug. 29, 2013; 3 pages.
Shenzhen Huadian Lighting Co., Ltd, "Professional Manufacturer of LED Tube, LED Panel Light, LED Down Lights, LED Spotlight, etc.," website description, undated; downloaded from http://www.hd-leds.com/products-detail.php?ProId=81 on Oct. 28, 2013; email received from website owner on Sep. 2, 2013; 2 pages.
Shenzhen Loevet Lighting Co. Ltd, "Wholesale 600*600mm LED Panel Light Series from Loevet Lighting Co., Ltd in China," website description, copyright 2008-2013; downloaded from http://www.lvt-lighting.com/led-panel-light-36W-600x600mm.html on Oct. 28, 2013; email received from website owner on Sep. 6, 2013; 3 pages.
Shenzhen Wak Optoelectronic Co., Ltd, "High Brightness LED Panel Light 600x600mm," website description, undated; downloaded from http://www.wak-led.com/product/showproduct.php?lang=en&id=111 on Oct. 28, 2013; email received from website owner on Aug. 25, 2013; 2 pages.
Tsanli Lighting Co., Limited, "LED Panels—LED Light Panel_ LED Panels—LED Light Panel Manufacturers & Suppliers," website description, copyright 2013; downloaded from http://www.sanli-led.com/LED_panel.aspx on Oct. 28, 2013; email received from website owner on Oct. 14, 2013; 8 pages.
Up-shine Lighting Co., Limited, "LED Panel Lamp, Dimmable LED Light, High Lumen LED Lamp, Up-Shine Lighting," website description, undated; downloaded from http://www.upshineled.com/5-led-panel-lamp.html on Oct. 24, 2013; email received from website owner on Oct. 14, 2013; 4 pages.
Westpac LED Lighting, Inc., "LED Panel Lights," website description, copyright 2013; downloaded from http://www.westpacled.com/products/led-panel-lights/ on Oct. 30, 2013.
Google Translation of DE 202012103430 U1 downloaded from www.google.com/patents on Nov. 1, 2013; 6 pages.
Newsen Electronics Technology Limited, "Newsen Technology, LED Manufacturer, LED Commercial Light, LED Home Light, LED Project Light," website description, copyright 2004-2009; downloaded from http://www.newsenlighting.com/productView.asp?Id=162 on Nov. 4, 2013; email received from website owner on Oct. 29, 2013; 3 pages.
Google Translation of DE 102010006465A1—downloaded from www.google.com/patents on Nov. 1, 2013; 4 pages.
Google Translation of EP 2270387 B1—downloaded from www.google.com/patents on Nov. 5, 2013; 7 pages.
Alite Co., Ltd., "Products/DLC qualified LED panel_Alite co., Ltd—Led tube lighting, Led bulb, Led spotlights lights, Led panel-china Led Lighting, China Led manufacturer," website description, copyright 2008-2013; downloaded from http://www.aliteled.com/a/Prouducts/dlcledpanel/ on Jan. 2, 2014; 2 pages.
Asia-Boslin Optoelectronics Sci & Tech Group Co., Ltd, "600x600mm 40W 5630 Samsung Ultra-Thin LED Panel Light," website description, copyright 2014; downloaded from www.simaoled.com/english/pro_show.asp?mid=2&name=40W%20LED%20Panel%20Light&pc1_id=13&p_id=741&p_name=40W%20LED%20Panel%20Light#123 on Apr. 15, 2014; email received from website owner on Mar. 10, 2014; 7 pages.
Ecother Technology Limited, "LED Panel Light ET-PL-S6060-36W," website description, copyright 2007-2012; downloaded from http://ecother.com/showproducts.php?id=41 on Apr. 1, 2014; 2 pages.
Emerge DDP Engineered LED Solutions, "Products|Emerge," website description, copyright 2014; downloaded from www.emergelighting.com/products/ on Feb. 19, 2014; 1 page.
HK Kstar Electronic Co., Ltd. "RGB 600*600 LED Panel Light," website description, undated; downloaded from http://www.kstar-lighting.com/product.asp?id=1675 on Jan. 2, 2014; email received from website owner on Sep. 25, 2013; 3 pages.
International Application No. PCT/US12/38315 International Preliminary Report on Patentability and Written Opinion of the International Searching Authority Dated Nov. 19, 2013 Attached to International Publication No. WO 2012/158894—Nov. 22, 2012. (12 pages).
International Application No. PCT/US12/38338 International Preliminary Report on Patentability and Written Opinion of the International Searching Authority Dated Nov. 19, 2013 Attached to International Publication No. WO 2012/158908—Nov. 22, 2012. (11 pages).
Kili-LED Lighting Limited, "LED Panel Light," website description, undated; downloaded from http://www.kili-led.com/?producten/Product57/ on Apr. 1, 2014; email received from website owner on Mar. 24, 2014; 3 pages.
Light Green International Co., Ltd., "Light Green International Co., Ltd| The Largest Manufacturer of LED Panel Lights in China," website description, copyright 2010-2012; downloaded from http://light-green.cn/english/Product_Catalog_03_01.aspx?id=65 on Apr. 16, 2014; email received from website owner on Apr. 2, 2014; 2 pages.
Opus Technology Development Co., Ltd., "600x1200mm LED Panel Light 80W," website description, undated; downloaded from http://www.opus-led.com/600x1200mm-LED-Panel-Light-80W.html on Mar. 12, 2014; email received from website owner on Mar. 10, 2014; 3 pages.
QuarkStar, "Light Shaping: An Innovative New Approach for SSL Luminaires," presentation from Strategies in Light conference on Feb. 25-27, 2014, undated; 32 pages.
Shenzhen CREP Optoelectronics Co., Ltd., "CREP Optoelectronic Co., Ltd.," website description, copyright 2010-2011; downloaded from http://www.crep-led.com/EN/products.aspx on Nov. 16, 2013; email received from website owner on Nov. 13, 2013; 2 pages.
Shenzhen King Star Opto-Electronic Co., Ltd, "China Ultra-thin Economical LED Panel Light supplier," website description, copyright 2005-2013; downloaded from http://www.ks-light.com/china-id293.html on Apr. 16, 2014; email received from website owner on Apr. 1, 2014; 5 pages.
Shenzhen Magreen Group Co., Ltd., "Shenzhen Magreen Lighting Technology Co., Limited," email attachment received by website owner on Apr. 1, 2014; undated; 3 pages.
Shenzhen Man Jia Technology Limited, "18w square led panel light with glass edge," website description, copyright 2011-2012; downloaded from http://www.manjia-lighting.com/detail/18wsquareledpanellightwithglassedge.html### on Nov. 16, 2013; email received from website owner on Nov. 16, 2013; 7 pages.
Shenzhen Ming Light Co., Ltd, "Minglight Manufacturing Co; Ltd>>LED Panel Light>>LED Panel Light 600x600 18&20&39W, IP54," website description, copyright 2011; downloaded from http://www.minglight.com.cn/LED%20Panel%20Light%20600x600%20%2018&20&39W,%20IP54-pii-48.html on Nov. 16, 2013; email received from website owner on Nov. 14, 2013; 4 pages.
Shenzhen MJ International, "Energy Light Index," website description, undated; downloaded from http://www.energyledlight.com/eindex.asp on Apr. 15, 2014; email received from website owner on Feb. 17, 2014; 1 page.
Shenzhen Ruidisi Lighting Co., Ltd, "RDS-6060-Ruidisi Lighting (HK) Co., Limited," website description, copyright 2013; downloaded from http://www.rds-led.com/Products/Candle_Light_Series/Square_panel_light/rds11.html on Nov. 16, 2013; email received from website owner on Nov. 16, 2013; 2 pages.
Shine Technology Ltd, "Led light—led panel light, led bulb and waterproof led power supply manufacturer in China," website description, copyright 1999-2013, downloaded from http://shine-technology.en.alibaba.com on Dec. 23, 2013; email received from website owner on Nov. 25, 2013; 3 pages.
Star Light Technology Group (China) Limited, "LED Panel light 1200*600 (Full color)—LED Panel Light—China—STAR," website

(56) References Cited

OTHER PUBLICATIONS description, copyright 1995-2013; downloaded from www.starlight-led.com/sdp/865240/4/pd-4460524/6793633-1955803/LED_Panel_light_600_600_Full_colors.html#normal_img on Dec. 23, 2013; 2 pages.

Tonya Lighting Technology Co., Ltd., "Tonya Lighting Technology Co., Ltd," website description, copyright 2009; downloaded from http://www.tonyalight.com/Default.aspx?PN=prd_view&ps=&pID=75466 on Nov. 15, 2013; email received from website owner on Nov. 15, 2013; 2 pages.

West Deer Technology Co., Limited, "Product Show," website description, copyright 2013; downloaded from http://wdeer-led.com/html/prs0/t287-310/c556.html on Apr. 15, 2014; email received from website owner on Mar. 3, 2014; 2 pages.

\* cited by examiner

FLAT PANEL LIGHTING DEVICE AND RETROFIT KIT

RELATED APPLICATION DATA

The present application claims benefit of U.S. Provisional App. No. 61/487,253, filed May 17, 2011, which is incorporated by reference in its entirety. The present application also claims benefit of U.S. Provisional App. No. 61/579,472, filed Dec. 22, 2011, which is incorporated by reference in its entirety.

FIELD OF INVENTION

Present invention relates generally to lighting assemblies, and more particularly to a versatile, substantially flat panel light emitting diode lighting assembly and retrofit lighting kit.

BACKGROUND

Lighting systems incorporating ceiling-mounted lighting fixtures or luminaires are routinely used to illuminate commercial floor space and objects residing on the floor space within the illuminated area. Luminaires generally consist of an assembly of components, such as lamps, ballasts, and reflectors, which cooperate to produce and direct light. Luminaires that incorporate fluorescent lamps are the most commonly used commercial light sources due to their relatively high efficiency, diffuse light distribution characteristics, and long operating life.

Fluorescent lamps are long tubes that contain mercury and argon gas. Electrodes sealed into each end of a tube allow the lamp to conduct an electric current, thereby emitting ultraviolet radiation. The tube of a fluorescent lamp is a glass envelope. The inside surface of the tube is coated with a phosphor that provides visible illumination when excited by ultra-violet radiation. The phosphor, or fluorescent coating, may be harmful to a person's eyes. The glass envelope is infamous for its ability to shatter and blanket an area with sharp glass. The neurological toxicities associated with mercury exposure are well documented. Additionally, only a portion of the radiation produced by a fluorescent lamp is ever converted into visible light. As with incandescent light bulbs, the excess radiation produces heat. Collectively, the heat generated by these lamps places a tremendous burden on the air conditioning system of a building, especially during the summer months in warmer climates.

Many conventional fluorescent lighting fixtures are adapted for recessed mounting in a suspended ceiling, in which the lighting fixtures have bulky box enclosures or troffers supported by adjacent pairs of T-bars comprising the support structure of the ceiling. In addition to housing and supporting the other components of the lighting fixture, the troffer provides a fire protection enclosure.

Over the lifetime of a commercial lighting system, the expenditures associated with operating and maintaining that system are significant. As lighting fixtures age and deteriorate, the light-emitting ability degrades and the light output per unit of consumed electrical energy is significantly reduced. Modern ballasts, lamps and reflectors are available that would significantly enhance the light-emitting ability of the lighting system and also significantly enhance the energy efficiency by reducing the power consumption. As a result, the light output could be increased while simultaneously reducing the associated energy costs. Thus, it is desirable to replace obsolete lighting fixtures with lighting fixtures that incorporate modern ballasts, lamps and lamp sockets to hold the lamps, and reflectors.

Existing lighting fixtures of commercial light systems cannot be easily upgraded to replace obsolete lighting fixtures with lighting fixtures that incorporate modern components, or refurbished with modern components to reverse the effects of deterioration. Conventional fluorescent lighting fixtures and available retrofitting kits are unsatisfactory for upgrading existing lighting systems because, among other things, the existing lighting fixtures must first be removed or, at the least, significantly modified by removing certain components from the existing lighting fixtures before the upgrade can be performed. Retrofitting with conventional fluorescent luminaires or available retrofitting kits is a labor-intensive and lengthy process that significantly disrupts commercial operations during the retrofit process. Furthermore, the removed lighting fixtures or components generate a waste stream for disposal or recycling. Disposal poses significant environmental concerns from hazardous or toxic substances in the removed components, such as mercury in the fluorescent lamps and chemicals including polychlorinated biphenyls (commonly referred to as PCB's) in the ballasts.

SUMMARY OF INVENTION

The present application is directed to a light fixture including a substantially flat light emitting diode (LED) panel and an associated retrofit lighting kit and retrofitting method. The light fixture and associated retrofit kit are configured to provide an extremely thin lighting device with great versatility and simplicity of installation for retrofit applications.

One aspect of the disclosed technology relates to a method of retrofitting a fluorescent housing unit, the fluorescent housing unit having an upper extent and a lower extent, the lower extent having a perimeter of a given shape and size. The method includes providing a substantially flat light emitting diode (LED) panel, the substantially flat LED panel having a shape and size of approximately the given shape and size of the perimeter of the lower extent of the fluorescent housing unit; electrically coupling the LED panel to a power supply associated with the fluorescent housing unit; and mounting the substantially flat LED panel to the fluorescent housing unit.

According to one feature, the substantially flat LED panel includes a frame having a shape and size of approximately the given shape and size of the perimeter of the lower extent of the fluorescent housing unit.

According to one feature, mounting includes mounting the substantially flat LED panel over the perimeter of the fluorescent housing unit.

According to one feature, mounting includes mounting the substantially flat LED panel within the perimeter of the lower extent of the fluorescent housing unit.

According to one feature, mounting includes hingedly mounting the substantially flat LED panel to the lower extent of the fluorescent housing unit.

According to one feature, the fluorescent housing unit includes a cover hingedly connected to a body, the cover including a diffuser and/or a lens, wherein mounting includes removing the diffuser and/or lens from the cover and mounting the substantially flat LED panel to the cover, such that the substantially flat LED panel is hingedly mounted to the body of the fluorescent housing unit via the cover.

According to one feature, the cover defines a channel around a perimeter of the cover, the channel having a thickness, wherein the substantially flat LED panel has a thickness approximately equal to the thickness of the channel around the perimeter of the cover.

According to one feature, the perimeter of the lower extent of fluorescent housing unit includes a channel having a thickness, wherein the substantially flat LED panel has a thickness approximately equal to the thickness of the channel around the perimeter of the lower extent of the fluorescent housing unit.

According to one feature, the fluorescent housing unit includes a reflector grid connected to a body, wherein mounting includes removing the reflector grid and mounting the substantially flat LED panel to the lower extent of the body of the fluorescent housing unit.

According to one feature, the fluorescent housing unit includes a reflector grid connected to a body, wherein mounting includes removing the reflector grid and mounting the substantially flat LED panel to the body of the fluorescent housing unit and replacing the reflector grid such that the substantially flat LED panel is positioned above the reflector grid.

According to one feature, electrically coupling includes removing a ballast associated with the fluorescent housing unit and electrically coupling the substantially flat LED panel to the power supply via a block transformer.

According to one feature, electrically coupling includes electrically coupling the substantially flat LED panel to the power supply via one or more fluorescent light sockets associated with the fluorescent housing unit.

According to one feature, the substantially flat LED panel includes one or more connectors configured to electrically connect with the fluorescent light sockets associated with the fluorescent housing unit.

According to one feature, electrically coupling includes electrically coupling the substantially flat LED panel to a ballast associated with the fluorescent housing unit.

According to one feature, electrically coupling includes electrically coupling the substantially flat LED panel to a ballast associated with the fluorescent housing unit via a transformer associated with the substantially flat LED panel.

According to one feature, electrically coupling includes electrically coupling the substantially flat LED panel to the power supply via a transformer incorporated into the frame of the substantially flat LED panel.

According to one feature, the substantially flat LED panel is edge lit.

According to one feature, the substantially flat LED panel includes a plurality of LEDs disposed adjacent at least one edge of the frame.

According to one feature, the frame is rectangular and the substantially flat LED panel includes an array of LEDs incorporated into at least two sides of the frame.

According to one feature, the substantially flat LED panel includes an optically-transmissive panel; an array of LEDs disposed adjacent at least one edge of the frame and the optically transmissive panel; a diffuser film disposed below the optically-transmissive panel; a brightness enhancement film (BEF) disposed above the optically-transmissive panel; and a reflector disposed above the BEF.

Another aspect of the disclosed technology relates to a lighting kit adapted for installation into a fluorescent lighting unit, the fluorescent lighting unit including a housing unit, a fluorescent socket, and a ballast disposed within the housing unit, the housing unit having an upper extent and a lower extent, the lower extent having a perimeter of a given shape and size. The lighting kit includes a substantially flat light emitting diode (LED) panel having a shape and size of approximately the given shape and size of the perimeter of the lower extent of the housing unit; power circuitry configured to electrically couple the substantially flat LED panel to a power supply; and at least one engagement member configured to couple the substantially flat LED panel to the housing unit of the fluorescent lighting unit.

Another aspect of the disclosed technology relates to a light fixture including a frame; a substantially flat light emitting diode (LED) panel disposed within the frame; and power circuitry disposed within the frame or adjacent the frame, the power circuitry being configured to electrically couple the substantially flat LED panel to an external power supply.

According to one feature, the substantially flat LED panel includes a plurality of LEDs disposed adjacent at least one edge of the frame.

According to one feature, the frame is rectangular and the substantially flat LED panel includes an array of LEDs incorporated into at least two sides of the frame.

According to one feature, the substantially flat LED panel includes an optically-transmissive panel; an array of LEDs disposed adjacent at least one edge of the frame and the optically transmissive panel; a diffuser film disposed below the optically-transmissive panel; a brightness enhancement film (BEF) disposed above the optically-transmissive panel; and a reflector disposed above the BEF.

According to one feature, the light fixture includes at least one mounting member configured to mount the frame to a substantially vertical support surface.

According to one feature, the substantially vertical support surface is a wall.

According to one feature, the light fixture includes at least one mounting member configured to mount the frame to a substantially horizontal support surface.

According to one feature, the light fixture includes at least one mounting member configured to mount the frame under a substantially horizontal support surface.

According to one feature, the substantially horizontal support surface is a storage cabinet.

According to one feature, the substantially flat LED panel includes a plurality of white LEDs.

According to one feature, the substantially flat LED panel includes a plurality of colored LEDs, where the colored LEDs are configured to cooperate to produce white light when energized.

According to one feature, the light fixture includes control circuitry configured to selectively energize the colored LEDs to provide light output of variable color temperature.

According to one feature, the colored LEDs include white LEDs with color filters.

According to one feature, the frame is rectangular and the substantially flat LED panel includes a light guide plate; a first array of LEDs incorporated into a first side of the frame adjacent a first side of the light guide plate, the first array of LEDs emitting light focused along a first direction; a second array of LEDs incorporated into a second side of the frame adjacent a second side of the light guide plate, the second array of LEDs emitting light focused along a second direction that is opposite the first direction; a first brightness enhancement film (BEF) positioned adjacent the light guide plate and configured to collimate light emitted by the first array of LEDs; and a second BEF positioned adjacent the first BEF and configured to collimate light emitted by the second array of LEDs.

According to one feature, the substantially flat LED panel includes a strip of LEDs disposed adjacent at least one edge of the frame, the strip of LEDs being removably coupled to the power circuitry via an electrical connector.

According to one feature, the power circuitry comprises a transformer.

According to one feature, the power circuitry comprises a LED driver disposed within the frame.

According to one feature, the power circuitry comprises a controller configured to control the intensity of the light emitted by the substantially flat LED panel.

According to one feature, a lighting assembly comprising the light fixture electrically coupled to a second light fixture, the second light fixture comprising a frame and a substantially flat light emitting diode (LED) panel disposed within the frame, wherein the second light fixture is electrically coupled to the first light fixture and configured to receive power from the external power supply associated with the first light fixture.

Another aspect of the disclosed technology relates to a desk lamp that includes a base, at least one support coupled to the base, and a substantially flat light emitting diode (LED) panel operatively coupled to the at least one support.

Another aspect of the disclosed technology relates to a light fixture that includes a frame; and a substantially flat light emitting diode (LED) panel disposed within the frame; wherein the frame includes a bottom assembly and a top assembly coupled to the bottom assembly, the bottom assembly and the top assembly cooperating to form a plurality of channels within the frame; and wherein the bottom assembly includes a back surface and a plurality of mounting tabs on the back surface, wherein the mounting tabs are movable between (i) a first unextended position where the mounting tabs are substantially co-planar with the back surface, (ii) a first extended position where the mounting tabs extend out at an angle of approximately 90 degrees relative to the back surface, and (ii) a second extended position where the mounting tabs extend out at an angle of approximately 180 degrees relative to the back surface.

According to one feature, the mounting tabs are integrally formed with the back surface of the bottom assembly.

According to one feature, the mounting tabs are formed as a cut-out from the back surface of the bottom assembly.

According to one feature, the mounting tabs are operatively coupled to the back surface of the bottom assembly.

According to one feature, the mounting tabs define an aperture configured to receive a fastener.

According to one feature, the light fixture is configured to be mounted to a flat surface by the mounting tabs.

Another aspect of the disclosed technology relates to a light fixture that includes a frame; a substantially flat light emitting diode (LED) panel disposed within the frame; wherein the frame includes a bottom assembly and a top assembly coupled to the bottom assembly, the bottom assembly and the top assembly cooperating to form a plurality of channels within the frame; and a mounting member configured to be attached to a flat surface, wherein the mounting member includes a plurality of engagement members configured to engage the bottom assembly of the frame.

According to one feature, the engagement members comprise a plurality of J-hooks configured to engage slots within outer edges of the bottom assembly.

According to one feature, the mounting member is configured to releasably engage the bottom assembly of the frame through a slide-lock mechanism.

According to one feature, the mounting member defines a central aperture configured to cooperate with an external junction box.

According to one feature, the mounting member defines a central aperture configured to receive AC input wiring.

Another aspect of the disclosed technology relates to a light fixture that includes a frame; a substantially flat light emitting diode (LED) panel disposed within the frame, wherein the frame includes a bottom assembly and a top assembly coupled to the bottom assembly, the bottom assembly and the top assembly cooperating to form a plurality of channels within the frame; power circuitry disposed within at least one of the plurality of channels within the frame, the power circuitry being configured to electrically couple the substantially flat LED panel to an external AC power supply; and a central wire-way disposed adjacent a back surface of the bottom assembly, wherein the central wire-way is configured to house wiring electrically coupled to the external AC power supply.

According to one feature, the central wire-way is configured to route wiring between opposite edges of the frame.

According to one feature, the central wire-way is configured to route wiring electrically coupling the external AC power supply to power supplies disposed within channels in opposite edges of the frame.

According to one feature, the central wire-way includes a back cover coupled to a back surface of the bottom assembly.

According to one feature, the back cover defines a central aperture configured to receive AC input wiring electrically coupled to the external AC power supply.

According to one feature, the central aperture is configured as a knockout hole.

Another aspect of the disclosed technology relates to a light fixture that includes a frame; a substantially flat light emitting diode (LED) panel disposed within the frame, wherein the frame includes a bottom assembly and a top assembly coupled to the bottom assembly, the bottom assembly and the top assembly cooperating to form a plurality of channels within the frame; power circuitry disposed within at least one of the plurality of channels within the frame, the power circuitry being configured to electrically couple the substantially flat LED panel to an external AC power supply; and a wire compartment disposed within at least one of the plurality of channels within the frame, wherein the wire compartment is configured to house wiring electrically coupled to the external AC power supply.

According to one feature, the bottom assembly of the frame defines an aperture configured to receive AC input wiring from the external AC power supply.

According to one feature, the light fixture includes a cover positioned over the aperture, the cover defining a central aperture configured to receive AC input wiring electrically coupled to the external AC power supply.

According to one feature, the central aperture is configured as a knockout hole.

According to one feature, at least one edge of the frame defines the wire compartment and a power supply compartment separate from the wire compartment.

According to one feature, the light fixture includes a central wire-way disposed adjacent a back surface of the bottom assembly, wherein the central wire-way is configured to route wiring between opposite edges of the frame.

According to one feature, the central wire-way is configured to route wiring from the wire compartment in one edge of the frame to the opposite edge of the frame.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings.

Moreover, in the drawings, like reference numerals designate corresponding parts throughout the several views.

DETAILED DESCRIPTION

Figure 1:
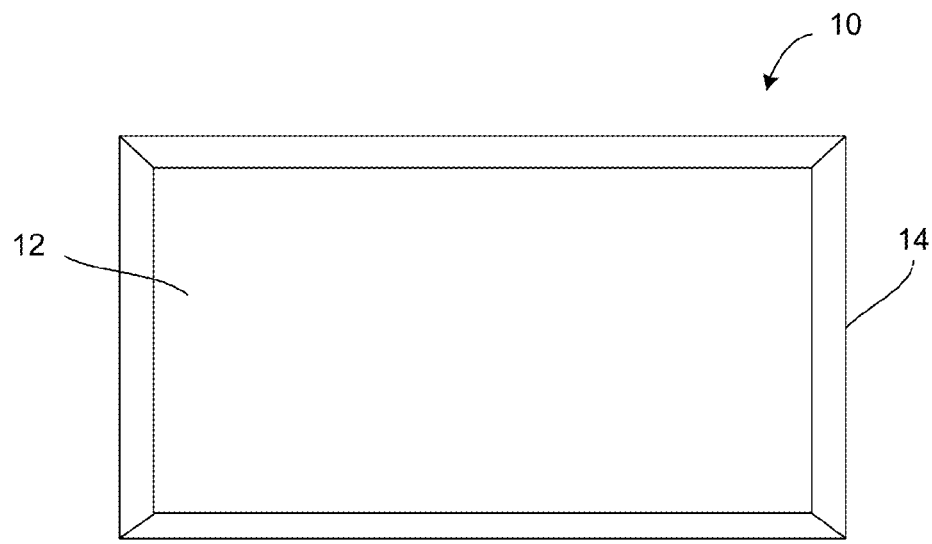
FIG. 1 is a diagrammatic illustration of a substantially flat LED panel in accordance with one aspect of the disclosed technology.
Figure 2:
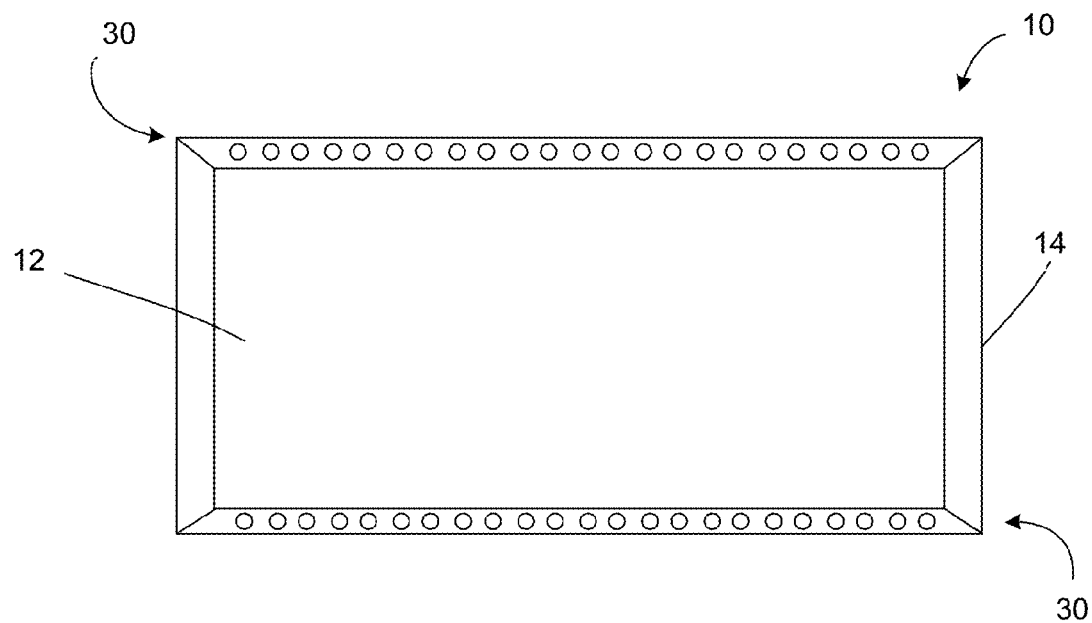
FIG. 2 is a diagrammatic illustration of a substantially flat LED panel in accordance with one aspect of the disclosed technology.
Figure 1A:
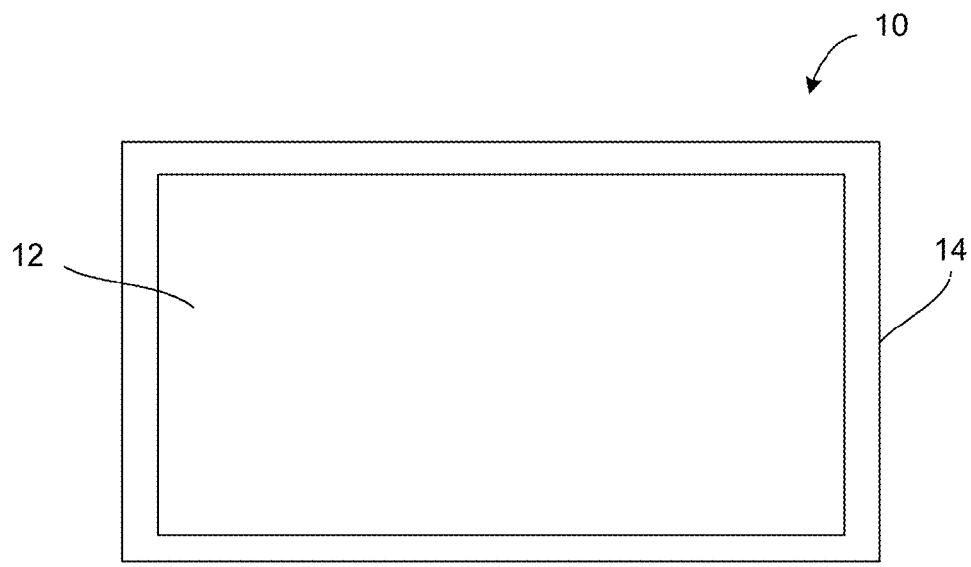
FIG. 1A is a diagrammatic illustration of a substantially flat LED panel in accordance with one aspect of the disclosed technology.
Figure 1B:
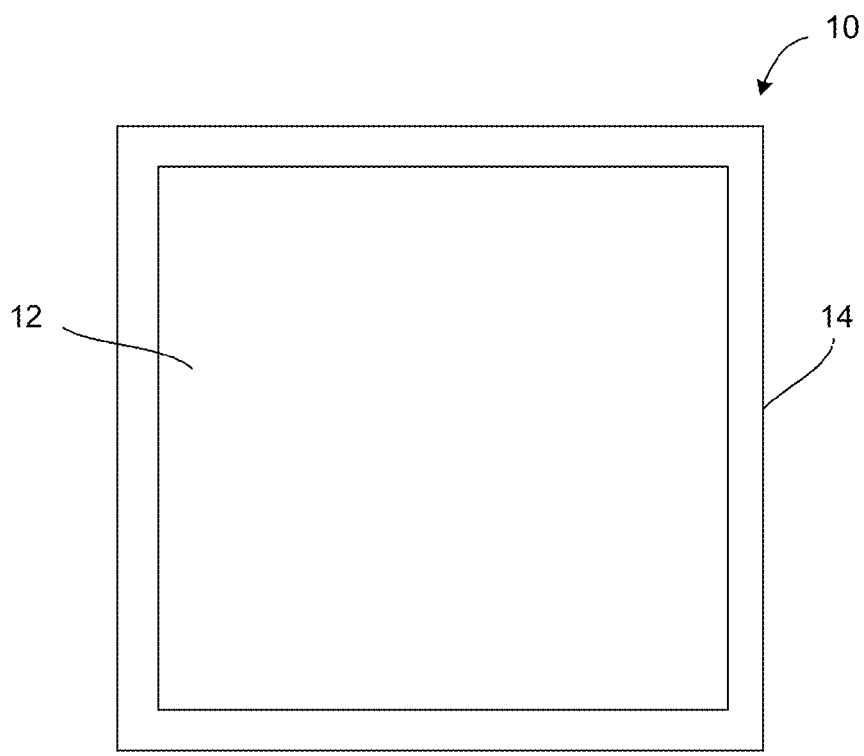
FIG. 1B is a diagrammatic illustration of a substantially flat LED panel in accordance with one aspect of the disclosed technology.
Figure 3:
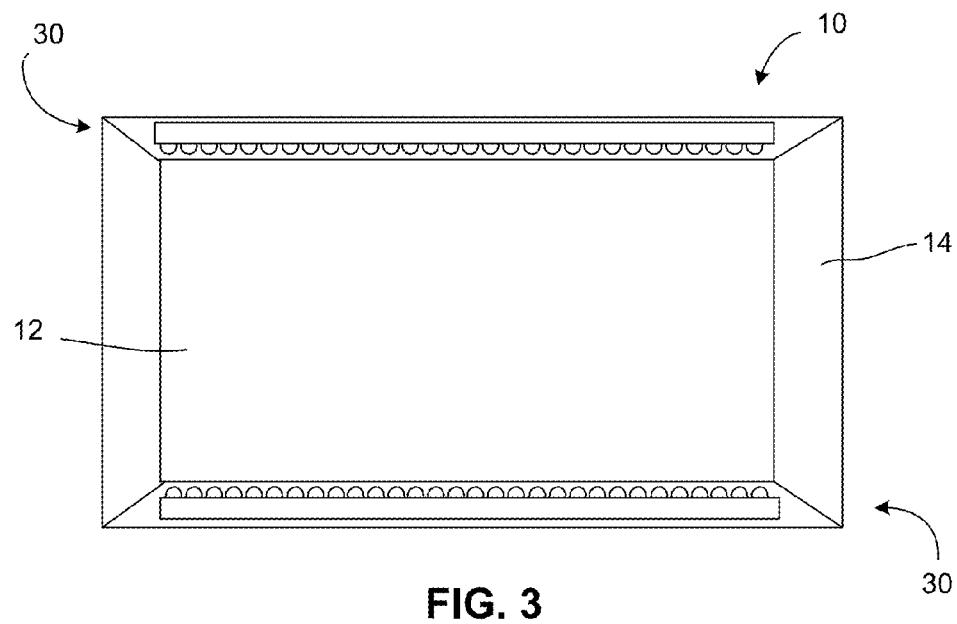
FIG. 3 is a diagrammatic illustration of a substantially flat LED panel in accordance with one aspect of the disclosed technology.
Figure 4:
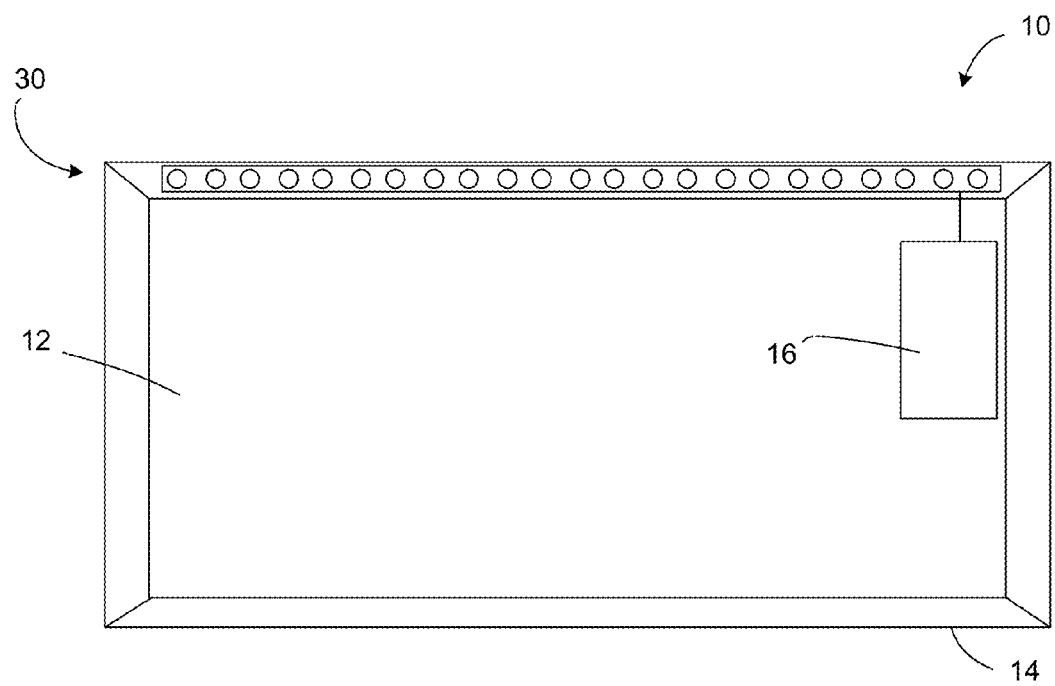
FIG. 4 is a diagrammatic illustration of a substantially flat LED panel in accordance with one aspect of the disclosed technology.

To illustrate aspects of the disclosed technology in a clear and concise manner, the drawings may not necessarily be to scale and certain features may be shown in somewhat schematic form.

Existing lighting fixtures of commercial light systems cannot be easily upgraded to replace obsolete lighting fixtures with lighting fixtures that incorporate modern components, or refurbished with modern components to reverse the effects of deterioration. Conventional fluorescent lighting fixtures and available retrofitting kits are unsatisfactory for upgrading existing lighting systems because, among other things, the existing lighting fixtures must first be removed or, at the least, significantly modified by removing certain components from the existing lighting fixtures before the upgrade can be performed. Retrofitting with conventional fluorescent luminaires or available retrofitting kits is a labor-intensive and lengthy process that significantly disrupts commercial operations during the retrofit process. Some retrofit kits are configured to employ light emitting diodes (LEDs) utilized in replacement components, however, these kits still require more complex installation and/or provide less than desirable light output.

The present disclosure recognizes shortcomings associated with conventional fluorescent lighting fixtures and conventional retrofit kits and provides an improved lighting fixture and associated retrofit kit including a substantially flat LED panel that can be formed in a variety of shapes and sizes. As is described more fully below, the substantially flat LED panel provides a low-thickness form factor that supports a variety of replacement, original installation and retrofit applications. The provision of a substantially flat LED panel having edge lighting allows for thin panels of flexible length and width providing uniform light output. The lighting fixture and associated retrofit kit provides a device with great versatility and simplicity of installation.

Referring now to FIGS. 1-9, an exemplary embodiment of a light fixture 10 having a light emitting diode (LED) panel 12 is provided. In one embodiment, the LED panel 12 is a substantially flat LED panel (also referred to simply as a LED panel). The term "substantially flat LED panel," as used in connection with the description of various embodiments, is meant to include LED panels having a thickness that is substantially less than the length and width of the panel. In addition, the term "substantially flat LED panel" is meant to include LED panels of slightly non-uniform thickness, for example, LED panels that include frames (designated generally as 14) having a thickness that is greater than the thickness of the light panel as well as LED light panels that do not include frames. As is discussed more fully below, the provision of a light fixture and associated retrofit lighting kit having a substantially flat LED panel provides for great versatility in application and simple installation in a variety of applications, including applications to retrofit existing fluorescent lighting units.

Viewing the substantially flat LED panel 12 from the front, the panel 12 can be divided into a frame 14, and light emitting structures 30 surrounded by the frame 14. The frame 14 provides structural support, contains components of the LED panel such as strips(s) of LEDs 30 and power circuitry (designated generally as 16), and provides heat dissipation. It will be appreciated that power circuitry 16 can include LED drivers, integrated power supplies, control circuitry, and the like. Generally, it is desirable for the frame 14 to be narrow, subject to the various requirements of the frame 14. In an embodiment of FIGS. 7-8, including externally mounted transformer block (16) with wired connection to LED strips 30, typical widths of the frame 14 are in the range of about 4 millimeters to about 10 millimeters, more preferably about 4 millimeters to about 8 millimeters. However, significantly narrower frames may be employed in conjunction with compact components such as microthin LED strips. Wider frames may also be used for functional or design considerations; for example the frame 14 of FIG. 6A includes wider segments to house relatively bulky driver circuitry 16. As another example, and as is described more fully below, the outer dimensions of the frame may be customized to fit within an enclosed space, such as a cover of a fluorescent housing unit, or an inside cabinet lighting installation. The outer and interior edges of the frame may have the same shape (e.g. rectangles) or different shapes. The frame may have the same or substantially similar width on all sides, or may have different widths on different sides as in FIG. 6A.

The light fixture 10, including the substantially flat LED panel 12, may take on a variety of dimensions and form factors, including, but not limited to, rectangular, other polygonal (e.g. octagonal), circular and elliptical form factors. For example, the light fixture 10 can be rectangular with a size of approximately two feet by four feet (2 feet×4 feet), corresponding to an exemplary lower dimension of a standard fluorescent ceiling troffer. In another exemplary embodiment, the light fixture 10 can have dimensions of about one foot by about four feet. In yet another exemplary embodiment, the light fixture 10 can be sized to standard lengths for under counter or under cabinet lighting applications (12 inches, 18 inches, 24 inches, 36 inches, etc.). It will be appreciated that the retrofitting method is not limited to fluorescent units of any particular size. The substantially flat LED panel 12 can take on any size without departing from the scope of the present invention. This versatility in sizing provides enhanced flexibility and use in connection with a variety of applications.

In accordance with one exemplary embodiment, the light fixture 10 includes a frame 14, a substantially flat LED panel 12 disposed within the frame 14 and power circuitry (designated generally as 16 disposed within the frame 14 or adjacent the frame 14, where the power circuitry 16 is configured to electrically couple the substantially flat LED panel 12 to an external power supply (not shown). The substantially flat LED panel 12 can be configured to provide bright, uniform light in a relatively thin package. For example, in one embodiment, the substantially flat LED panel 12 has a thickness of less than about 1.0 inches. In accordance with another embodiment, the substantially flat LED panel 12 has a thickness of less than about 0.5 inches.

Figure 8:
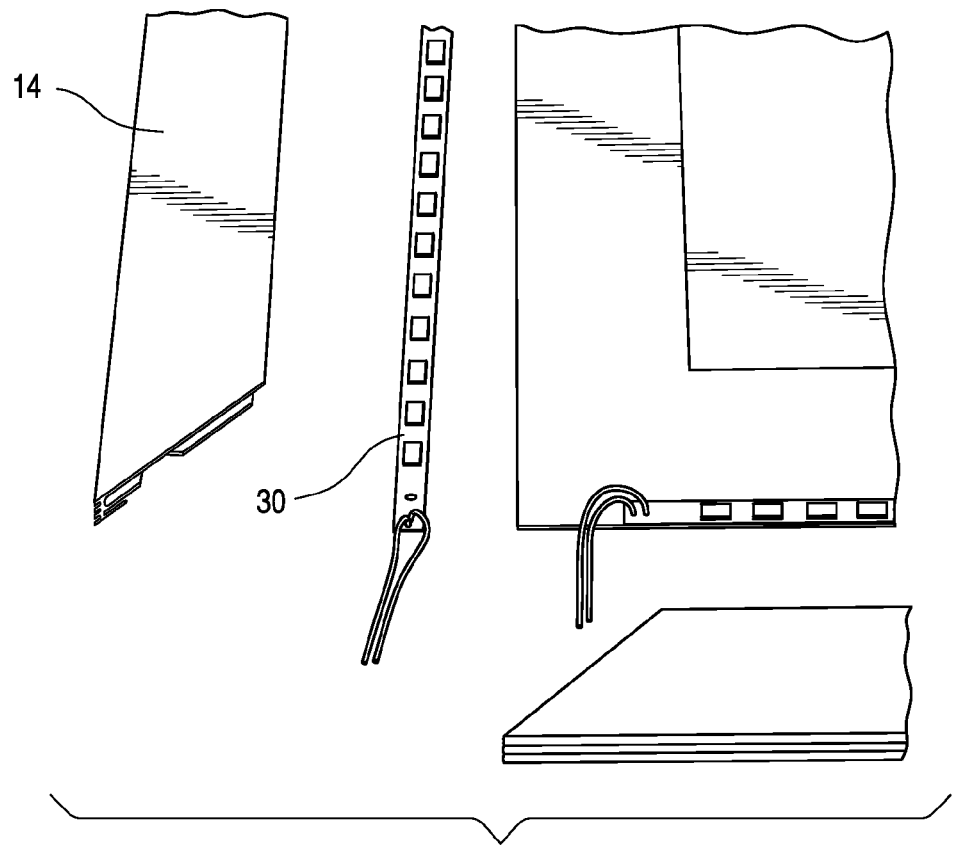
FIG. 8 shows a portion of a substantially flat LED panel in accordance with one aspect of the disclosed technology.
Figure 9:
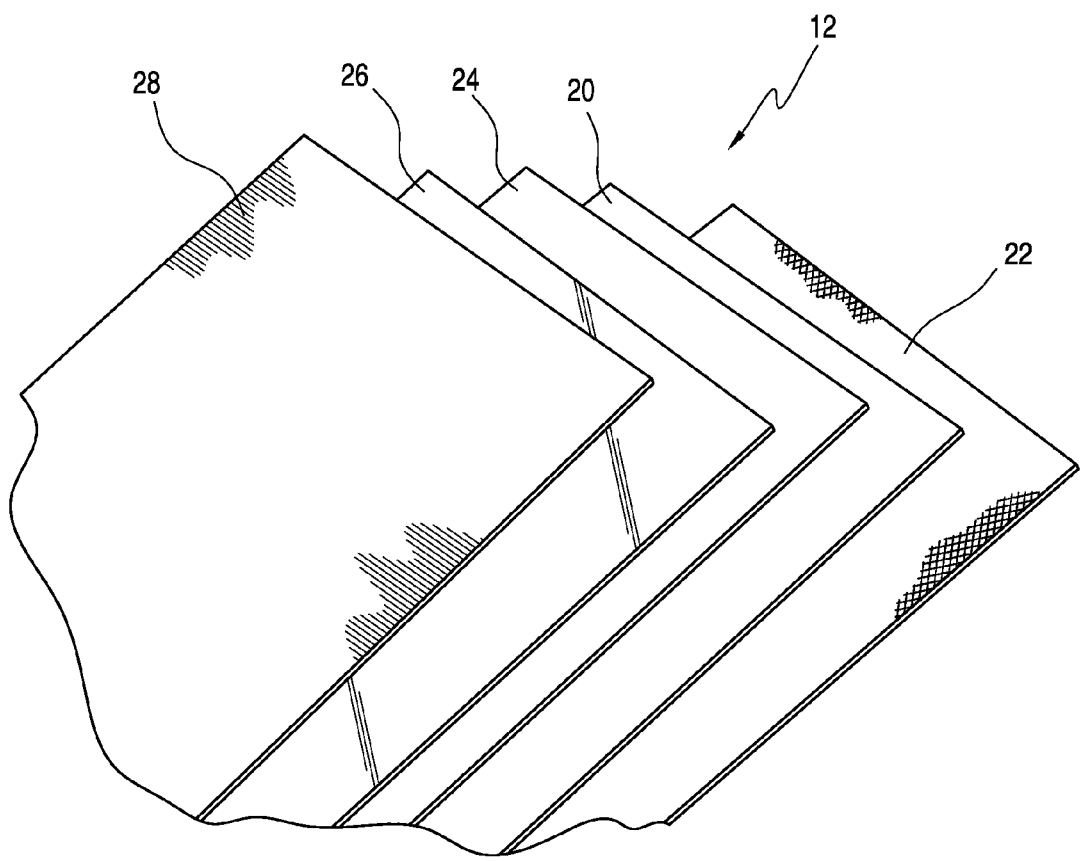
FIG. 9 shows an exploded view of an optical stack of a substantially flat LED panel in accordance with one aspect of the disclosed technology.

FIGS. 8 and 9 show an exemplary embodiment in which the substantially flat LED panel includes a plurality of layers along with edge lighting disposed adjacent to at least one edge of the frame. In the illustrated exemplary embodiment, the substantially flat LED panel includes an optically-transmissive panel 20, e.g., a light guide plate or other polycarbonate or acrylic plate configured to produce even distribution of light received at edges of the optically-transmissive panel 20. An array of LEDs (designated generally as 30) can be disposed adjacent at least one edge of the frame 14 and the optically transmissive panel 20. For example, a strip of LEDs 30 may be supported adjacent to one edge of the frame 14 (e.g., disposed within a channel in the frame) and adjacent to one edge of the optically-transmissive panel 20. Alternatively, the substantially flat LED panel 12 can include strips of LEDs 30 incorporated into or at least partially supported by two edges of the frame 14. In yet another exemplary embodiment in which the light fixture 10 has a rectangular form factor, the substantially flat LED panel 12 can include strips of LEDs 30 incorporated into or at least partially supported by all four edges of the frame 14. The LEDs can be sized and positioned such that the "emission dimension" of the LED elements has the same thickness or slightly less thickness than the thickness of the light input edge of the optically-transmissive panel, thereby allowing for an extremely thin profile.

The substantially flat LED panel 12 can include a diffuser film 22 disposed on a first side of the optically-transmissive panel 20, e.g., below the optically transmissive panel 20 when the fixture is mounted horizontally for a ceiling lighting application. The outer diffuser film 22 is configured to provide uniform light output, and can be made of any suitable material. For example, for outdoor applications, the outer diffuser film 22 can be a weatherable film. The outer diffuser film 22 can be configured as a soft film or as a hard, abrasion-resistant film depending upon the particular application. The outer diffuser film 22 can be made waterproof or moisture proof depending upon the desired application.

The substantially flat LED panel 12 can include a brightness enhancement film (BEF) 24 disposed on a second side of the optically-transmissive panel 20, e.g., above the optically transmissive panel 20 when the fixture is mounted horizontally for a ceiling lighting application. The brightness enhancement film 24 can be configured to collimate light along a vertical axis to improve the overall light output from the substantially flat LED panel 12. In accordance with one embodiment, the substantially flat LED panel can be configured to include multiple BEFs optimized for the particular arrangement of LEDs along one or more edges of the substantially flat LED panel. In this exemplary embodiment the substantially flat LED panel can include an optically transmissive panel in the form of a light guide plate with a first array of LEDs incorporated into a first side of the frame adjacent a first side of the light guide plate, the first array of LEDs emitting light focused along a first direction, and a second array of LEDs incorporated into a second side of the frame adjacent a second side of the light guide plate, the second array of LEDs emitting light focused along a second direction that is opposite the first direction. The substantially flat LED panel can include a first brightness enhancement film (BEF) positioned adjacent the light guide plate and configured to collimate light emitted by the first array of LEDs, and a second BEF positioned adjacent the first BEF and configured to collimate light emitted by the second array of LEDs.

Turning back to FIG. 9, the substantially flat LED panel 12 can include a reflector 26 positioned on the other side of the BEF 24, e.g., above the BEF 24 when the fixture is mounted horizontally for a ceiling lighting application. The reflector 26 is configured and position to return a portion of the light emitted by the optically-transmissive panel 20 in a direction opposite the intended output direction, thereby providing enhanced total light output. In the illustrated exemplary embodiment, the substantially flat LED panel 12 includes a backing 28, e.g., a sheet metal backing disposed adjacent the other side of the reflector 26. A sheet metal backing 28 in combination with a metallic (e.g. aluminum) frame (14) can provide excellent dissipation of heat generated by the LEDs.

Figure 16:
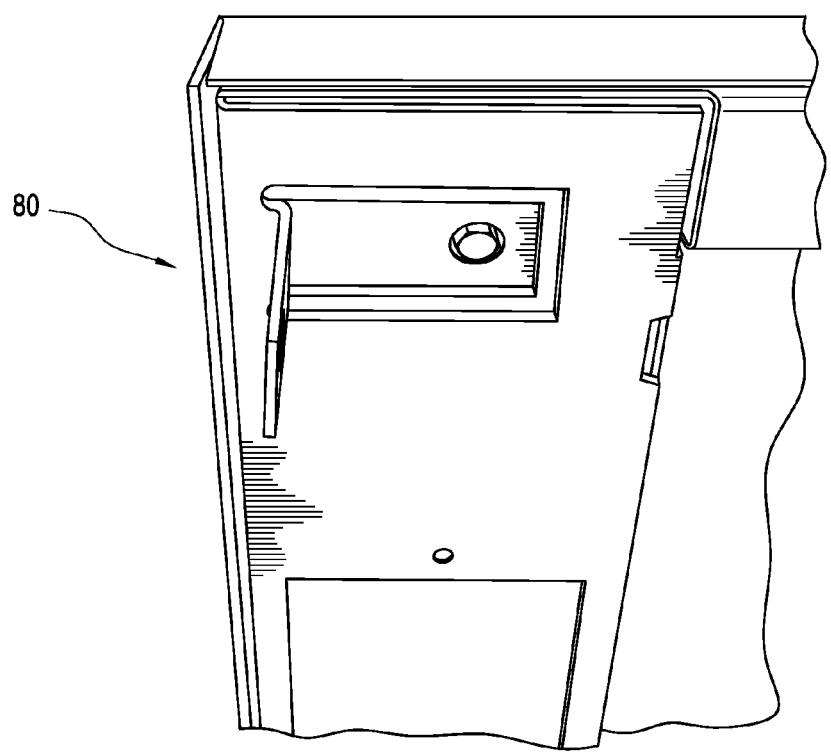
FIG. 16 shows an exemplary mounting tab in a second position in accordance with one aspect of the disclosed technology.

The light fixture 10 includes power circuitry 16 disposed within the frame 14, adjacent the frame 14 or outside the frame 14, where the power circuitry 16 is configured to electrically couple the substantially flat LED panel 12 to an external power source. In one exemplary embodiment, where the light fixture is employed in a retrofitting application for a fluorescent ceiling light, the power circuitry 16 can include a block transformer configured to be electrically coupled directly to an external power supply, to the external power supply through a socket associated with the fluorescent lighting unit (see, for example FIGS. 16 and 17) or to a ballast associated with the fluorescent lighting unit.

Figure 5:
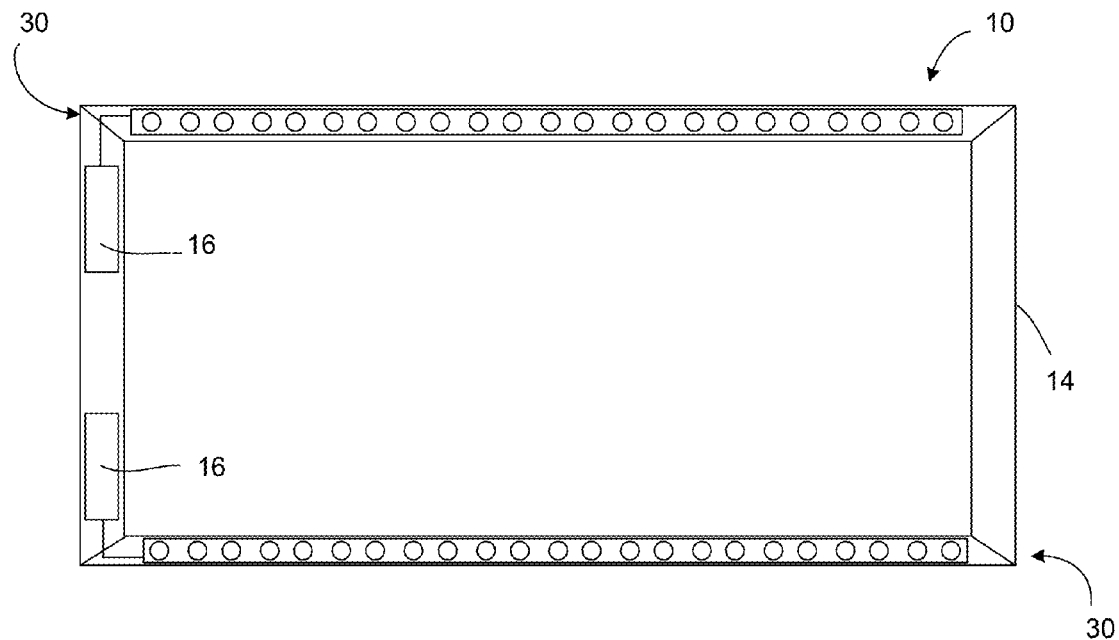
FIG. 5 is a diagrammatic illustration of a substantially flat LED panel in accordance with one aspect of the disclosed technology.
Figure 6:
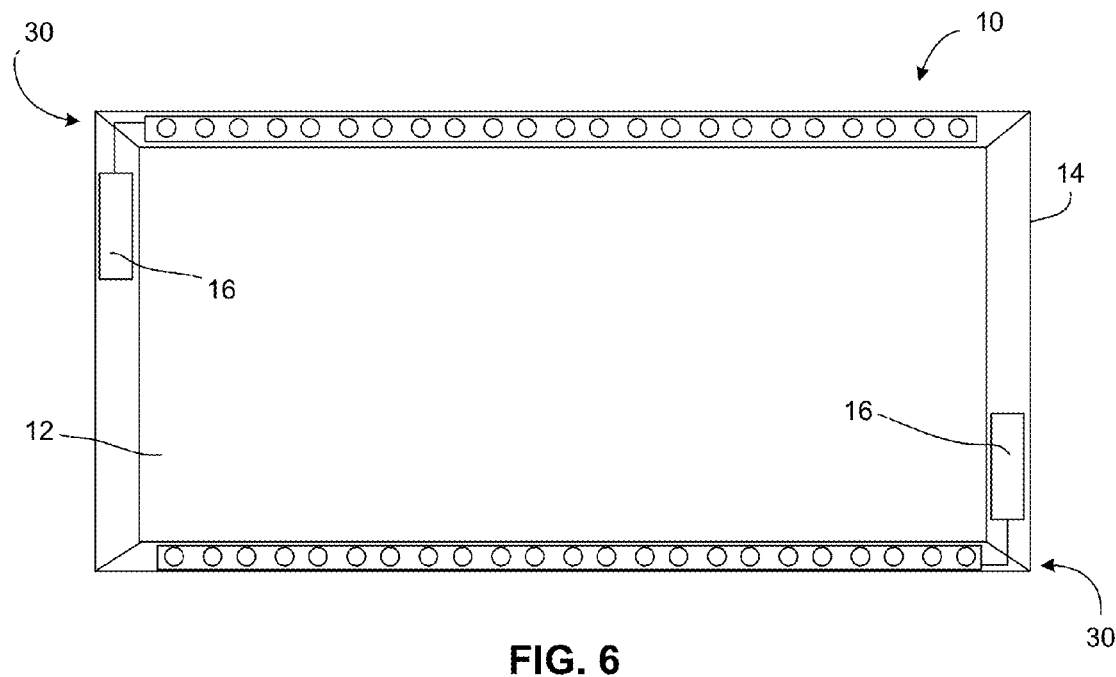
FIG. 6 is a diagrammatic illustration of a substantially flat LED panel in accordance with one aspect of the disclosed technology.

In accordance with an alternative embodiment, the power circuitry can include an LED driver incorporated into a portion of the frame and configured to electrically couple the LEDs to an external power source. It will be appreciated that this embodiment serves to provide a light fixture with an extremely thin form factor that can be easily mounted to a flat surface, such as a wall, an underside of a cabinet or the like. As shown in FIGS. 5 and 6, the light fixture 10 can be configured to include first and second LED strips 30 disposed on opposite sides of the frame 14, along with power circuitry in the form of a pair of LED drivers 16 positioned in one or both of the remaining sides of the rectangular frame. The illustrated embodiment shows a first LED driver 16 electrically coupled to and configured to control a first LED array (e.g., an LED strip 30), along with a second LED driver 16 coupled to and configured to control the second LED array (e.g., an LED strip).

Figure 6A:
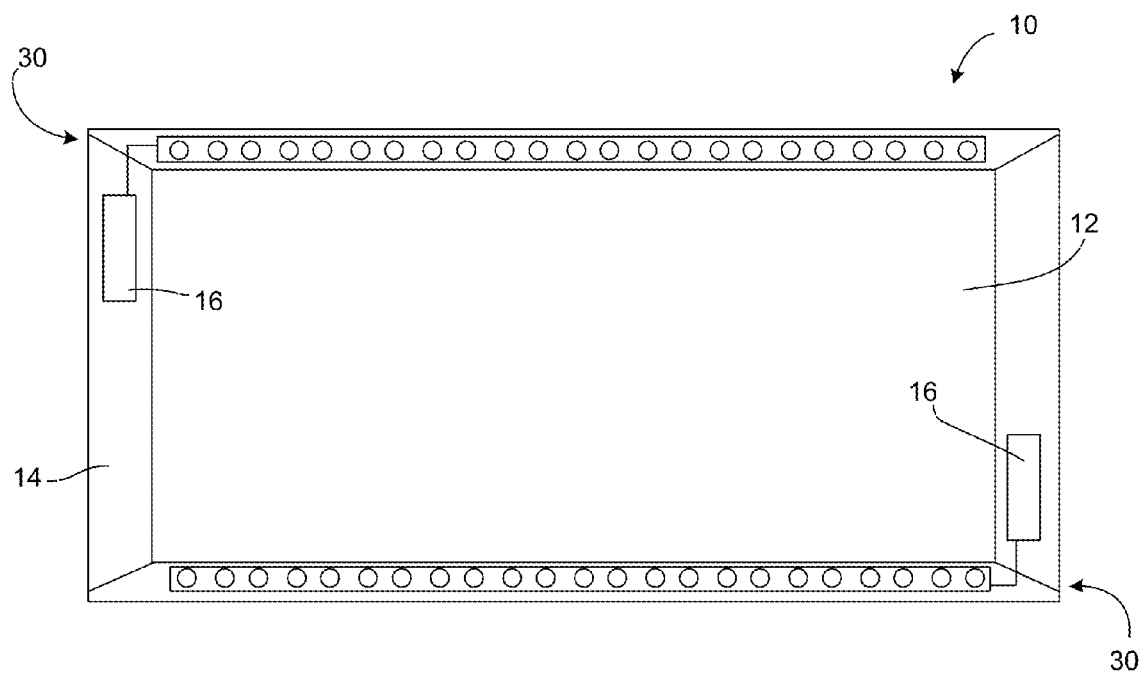
FIG. 6A is a diagrammatic illustration of a substantially flat LED panel in accordance with one aspect of the disclosed technology.
Figure 7:
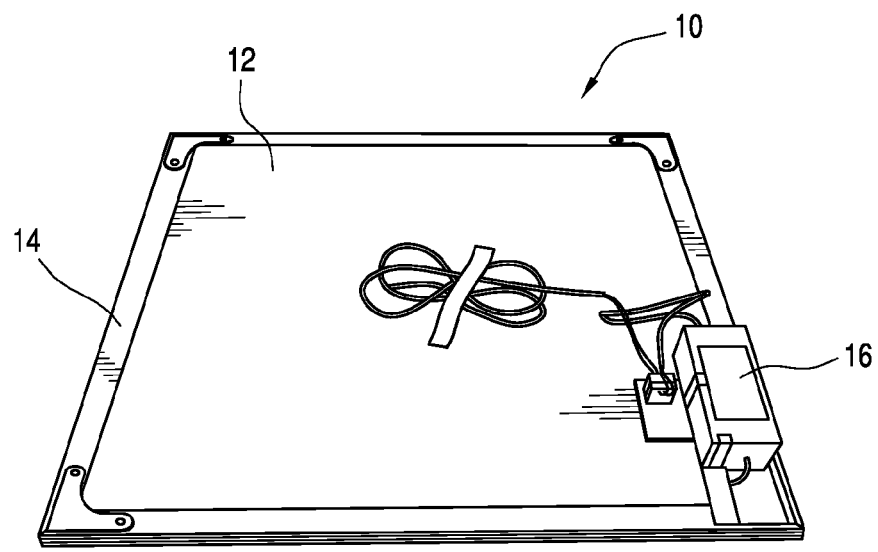
FIG. 7 is a rear view of a substantially flat LED panel in accordance with one aspect of the disclosed technology.

FIG. 6A shows an alternative light fixture 10 with first and second LED strips 30 disposed on opposite sides of the frame 14 (e.g., on a top side of the frame and on a bottom side of the frame in the orientation provided in FIG. 6), and with a pair of LED drivers 16 positioned on both remaining sides of the frame. These remaining sides are wider than the sides containing of the LED strips, in order to house larger LED drivers (e.g. PCB-mounted transformers and other driver components).

As is discussed more fully below, it will be appreciated that it is desirable to provide lighting kits well suited to a variety of installations. Generally, in designing a flat LED panel, one should optimize the optical stack and LEDs to satisfy optical requirements of the intended applications, having in mind anticipated form factor and driver specifications of the flat LED panel. In providing a "universal" lighting kit, it is relatively easy to modify the frame design without changing the core optical assembly, e.g. to provide different versions of the lighting kit with minor variations in form factor or associated components.

The substantially flat LED panel can include a plurality of LEDs having outputs of various colors and/or color temperatures. For example, the substantially flat LED panel can include white LEDs having output of a predetermined color temperature. In accordance with another embodiment, the substantially flat LED panel can include a plurality of colored LEDs (e.g., LEDs having red output, green output and blue output), where the colored LEDs are configured to cooperate to produce white light when energized. In the case of a plurality of colored LEDs, the light fixture can include control circuitry that is configured to selectively energize the colored LEDs to provide light output of variable color temperature. The control circuitry also can be configured to control the intensity of the light emitted by the substantially flat LED panel, thereby providing a dimming function.

In accordance with one embodiment, the substantially flat LED panel includes one or more strips of LEDs disposed adjacent and least one edge of the frame, where the strip of LEDs is removably coupled to the power circuitry via a suitable electrical connector. It will be appreciated that this configuration allows for the easy replacement of one or more strips of LEDs within the substantially flat LED panel. For example, in the case of LED failure or burnout, the strip of LEDs could be easily replaced without replacing the entire fixture. In addition, the color output of the light fixture could be altered by swapping out one or more of the LED strips. For example, a holiday effect could be achieved by removing a strip of white LEDs and replacing the strip of white LEDs with colored LEDs. To facilitate replacement of one or more LED strips within the flat LED panel, the frame can be provided with one or more sections that can be detached or otherwise separated from the remainder of the frame. For example, a cover section of the frame containing an LED strip may include a hinged connection to the remainder of the frame, and a pull tab. The user would pull open the cover section of the frame in order to uncover the LED strip for replacement.

In accordance with one embodiment, the light fixture includes at least one mounting member configured to mount (e.g., removably or permanently mount) the frame to a support surface. It will be appreciated that the mounting member may take on numerous forms depending on the desired application. For example, the mounting member can be configured to mount the frame to a substantially vertical support surface, such as a wall. In this case, the mounting member may include suitable clips, brackets or the like configured to anchor the light fixture to a wall in a home, a wall in a hotel, a wall in a parking garage or the like. In another exemplary embodiment, the mounting member can be configured to mount the frame to a substantially horizontal support surface, such as a ceiling, the underside of a cabinet or the like. Examples of other applications include, but are not limited to, stairwell lighting, emergency lighting (optionally including a battery backup), task lighting for cubicles, under counter lighting (e.g., kitchen work areas and within china cabinets), home or commercial garage lighting, lighting for retail shelving, aquarium lighting, and the like. As is described more fully below, the light fixture can be employed in a retrofit kit to retrofit an existing fluorescent lighting unit.

The mounting member can be tailored to the application. In applications in which it is anticipated that the flat LED panel will be removed as a whole for maintenance or replacement, a demountable mounting member should be chosen. On the other hand, in applications in which the flat LED panel will not be normally removed as a whole, but may be maintained by replacing components such as LED strips, a paramount consideration would be physical security of the mounting. For example, in a flat LED panel retrofit kit designed for surface mounting to fluorescent ceiling lighting fixtures, one should use a secure mounting that satisfies earthquake safety standards.

It will be appreciated that the light fixture can be arranged and/or installed together with a plurality of light fixtures where a primary light fixture is electrically coupled to an external power supply and other light fixtures can be coupled to the external power supply by way of the primary light fixture (so called "daisy chaining").

Turning now to FIGS. 10-35, embodiments will be discussed in which the light fixture 10 can be easily mounted to a flat surface, such as a wall, a ceiling, such as in a parking garage, the underside of a cabinet or the like. While these features and embodiments are being discussed in connection with mounting the light fixture to a flat surface, it will be appreciated that these features are equally applicable to retrofit applications. In these embodiments, the power circuitry can be integrated or otherwise disposed within a portion of the frame 14. It should be appreciated, however, that these embodiments also may be employed together with an external power supply.

In accordance with one embodiment, which may be implemented together with one or more of the other embodiments discussed in the present application, the frame includes a bottom assembly 60 (also referred to as a bottom frame assembly, a bottom panel or a bottom panel assembly) and a top assembly 62 (also referred to as a top frame assembly, a top panel or a top panel assembly) operatively coupled to the bottom assembly 60 (e.g., by suitable fasteners, such as screws, or by a snap fit). As is discussed more fully below, the bottom assembly 60 and the top assembly 62 cooperate to form a plurality of channels within the frame. These channels can house or otherwise support power circuitry (including power supplies and associated driving circuitry), wiring, LED arrays and the like.

As is discussed above, the frame 14, made up of the top assembly 62 operatively coupled to the bottom assembly 60, can take on a variety of form factors and dimensions without departing from the scope of the present invention. For example, the frame can be approximately two feet by approximately two feet (2 feet×2 feet), approximately one foot by approximately two feet (1 foot×2 feet), approximately one foot by approximately four feet (1 foot×4 feet), or the like.

The bottom assembly 60 is configured such that a central region of the bottom assembly is positioned over the rear of the optical components of the substantially flat LED panel 12. The bottom assembly 60 can include a bottom panel 62 configured to receive one or more brackets 66, 68 within the inside edges of the bottom panel 62, thereby forming the bottom assembly 60.

Figure 10:
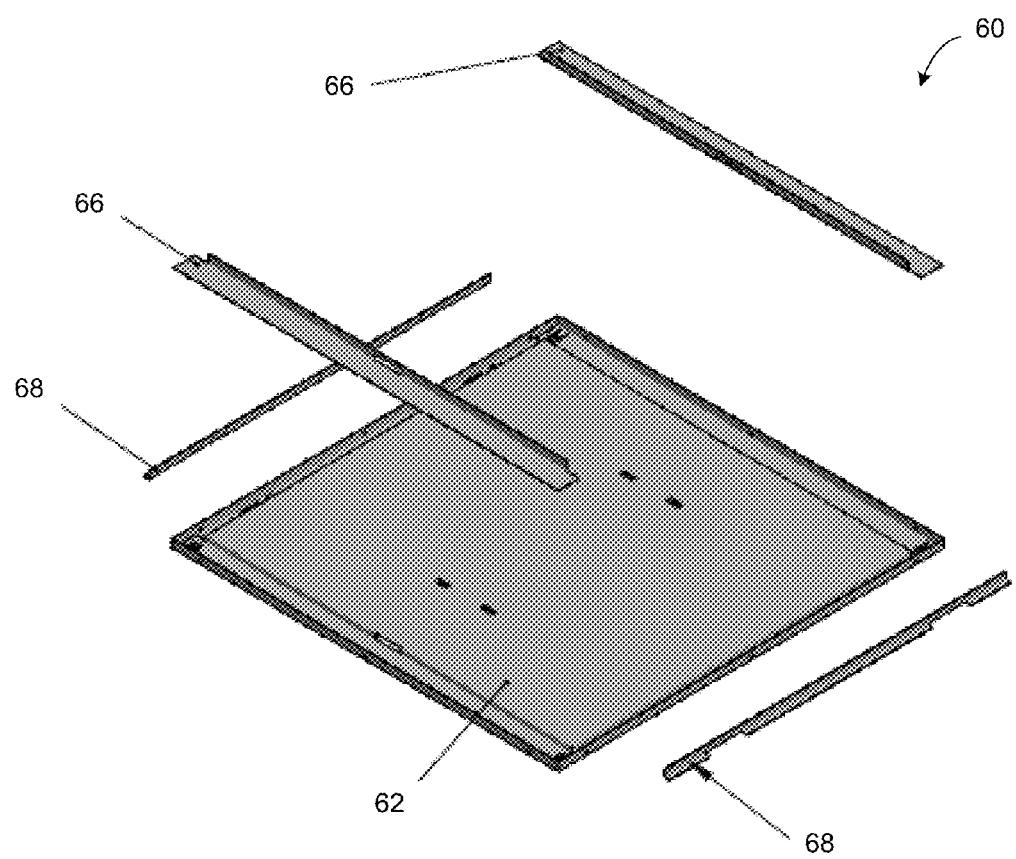
FIG. 10 shows an exploded view of bottom frame assembly in accordance with one aspect of the disclosed technology.

For example, the exemplary embodiment illustrated in FIG. 10 shows a pair of brackets 66 at two opposite edges of the bottom panel (e.g., edges that house or otherwise support power supplies and/or driving circuitry). In the illustrated exemplary embodiment, the other two opposite edges of the bottom assembly 60 include a pair of inside brackets 68 configured to support LED strips or arrays. As will be discussed more fully below, the bottom panel 62 can include or otherwise define two sets of slots configured to receive engagement members of an associated mounting plate or other mounting structure.

Figure 13:
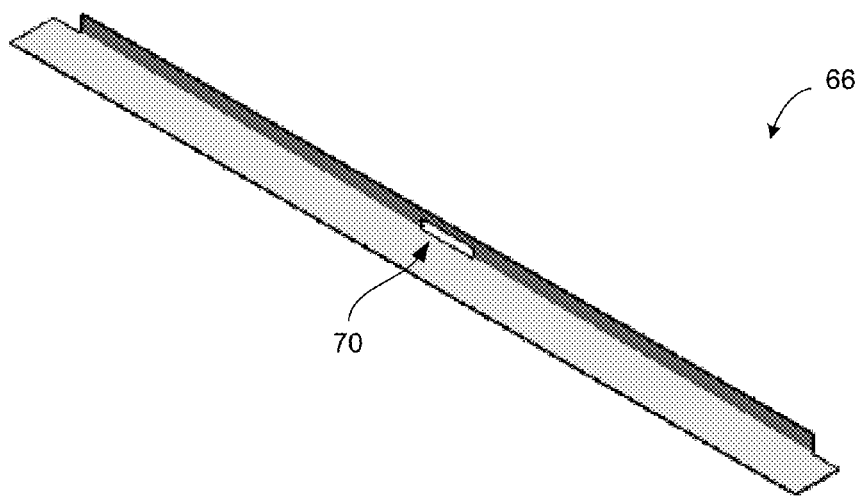
FIG. 13 is an enlarged view of an exemplary inside bracket shown in FIG. 10.

FIG. 13 shows an exemplary embodiment of a first pair of inside brackets 66. Each of the inside brackets 66 within the first pair of inside brackets 66 can be configured to form the bottom and edge surfaces of channels that contain the power supplies at opposite edges of the frame. In the embodiment illustrated in FIG. 13, the narrower leg of the L-shaped inside bracket 66 is configured to separate the power supply compartment from a central region at the rear of the lighting fixture. A central slot 70 provides an aperture through which AC input wires may be routed between the power supply compartment(s) and the central area of the frame assembly. For example, wires can be routed through this hole to a central wire-way (described more fully below). Cut away areas at the ends of the inside brackets can be configured to provide apertures through which DC-out wires from the power supply can be routed to connect to LED strips on the other two edges of the frame.

Figure 14:
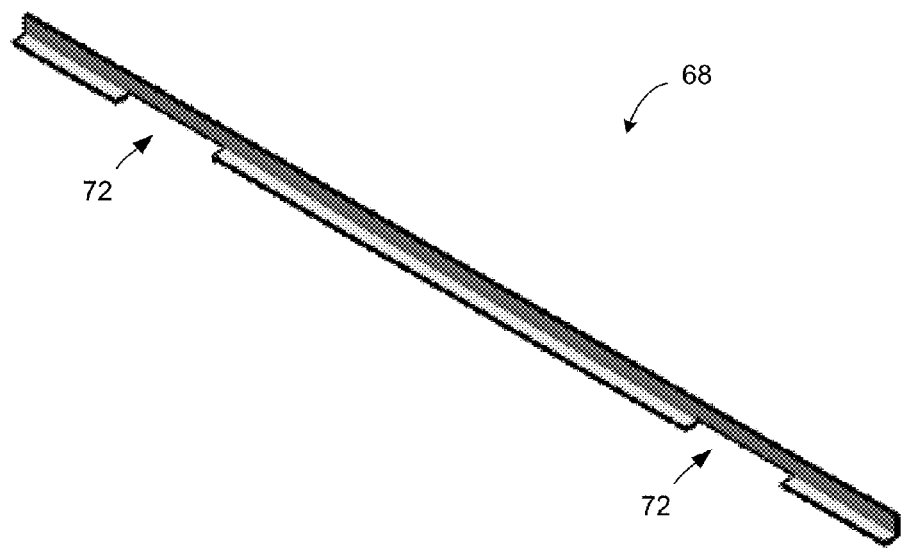
FIG. 14 is an enlarged view of an exemplary inside bracket shown in FIG. 10.
Figure 15:
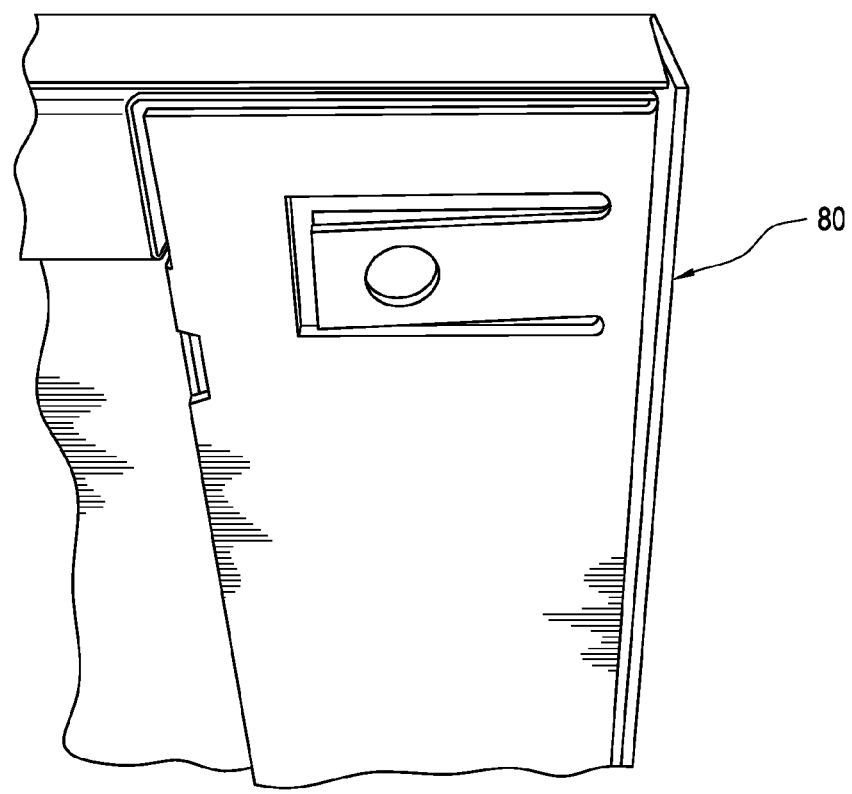
FIG. 15 shows an exemplary mounting tab in a first position in accordance with one aspect of the disclosed technology.

FIG. 14 shows an exemplary embodiment of a second pair of inside brackets 68. In the illustrated exemplary embodiment, each bracket 68 is configured to cooperate with the bottom panel 62 to hold an LED strip and mount the LED strip to one edge of the frame. The indented areas 72 of each inside bracket allow for mounting the inside bracket to fit to the side of the frame assembly. Engagement members at inner edges of the bottom panel can engage the indented areas 72 of each inside bracket 68.

Figure 17:
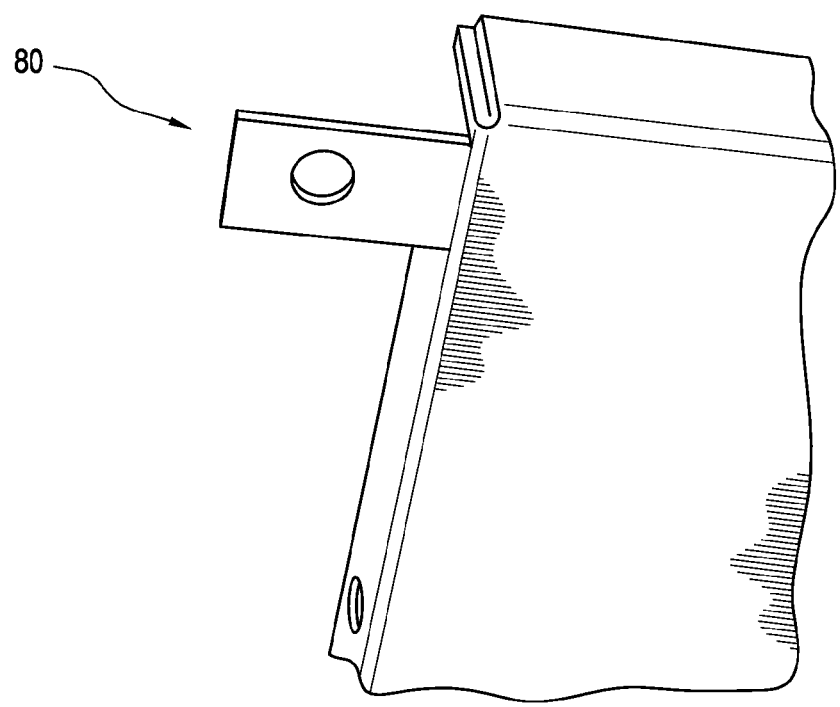
FIG. 17 shows an exemplary mounting tab in a third position in accordance with one aspect of the disclosed technology.
Figure 18:
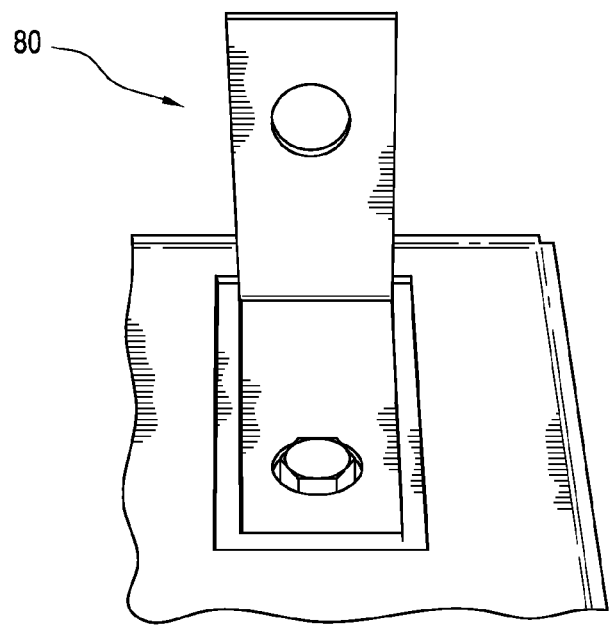
FIG. 18 shows an exemplary mounting tab in a second position in accordance with one aspect of the disclosed technology.
Figure 19:
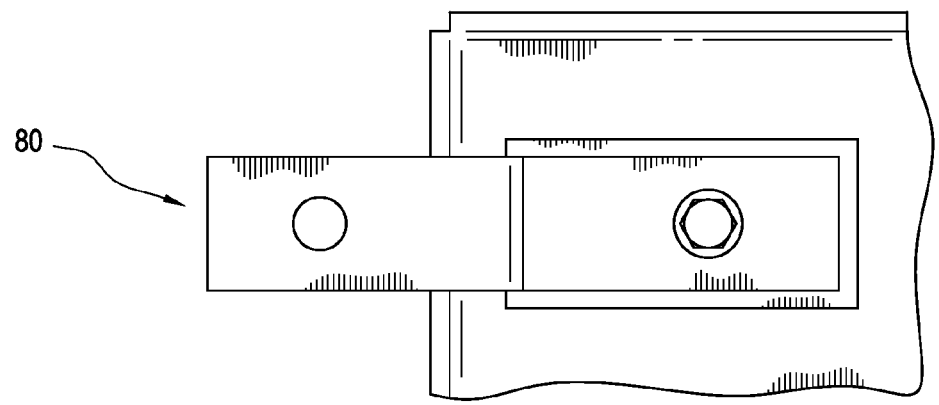
FIG. 19 shows an exemplary mounting tab in a third position in accordance with one aspect of the disclosed technology.

In accordance with one or more embodiments, the bottom assembly 62 can include one or more mounting tabs 80. The mounting tabs 80 can be integrally formed with a portion of the bottom assembly 60 (e.g., a movable or repositionable cut-out portion of the bottom assembly 60). Alternatively, the mounting tabs 80 can be operatively coupled to the bottom assembly 60. As shown in FIGS. 15-19, the mounting tabs 80 can be configured to be positioned in one of at least three positions: (1) an unextended, neutral or default position (FIG. 15), (2) a 90-degree position (bent or otherwise positioned at an angle of approximately 90 degrees relative to a back surface of the bottom assembly) (FIG. 16 and FIG. 18) and (3) a 180-degree position (bent or otherwise positioned at an angle of approximately 180 degrees relative to a back surface of the bottom assembly) (FIG. 17 and FIG. 19).

The mounting tabs 80 can be rectangular in shape or can take on another convenient shape. As can be seen in FIGS. 18-19, the mounting tabs 80 include or otherwise define a mounting aperture 82 configured to accept a suitable fastener, such as a screw. It will be appreciated that the mounting tabs 80 can be configured to cooperate with other fasteners, such as by securing wire hangers to the mounting tabs in their 90-degree position to provide a pendant lighting fixture. It also will be appreciated that the provision mounting tabs allows for mounting of the light fixture against a flat surface without having mounting fasteners penetrate the frame of the light fixture, such as by securing the light fixture to a wall surface using screws inserted through the mounting tabs extending from the light fixture in their 180-degree position.

Alternatively, in embodiments in which the light fixture is mounted to a support surface using another mechanism than the mounting tabs (such as retrofitting within a fluorescent housing unit), the mounting tabs may be used to anchor the light fixture with wiring inserted through the mounting aperture, in order to satisfy earthquake standards.

In accordance with another exemplary embodiment, which may be implemented together with one or more of the other embodiments discussed in the present application, the light fixture can include or otherwise be associated with a mounting member in the exemplary form of a mounting plate 90 for mounting the light fixture to a flat surface. It will be appreciated that the mounting plate will take on a size and form factor that corresponds approximately to the size and form factor of the bottom assembly of the frame.

Figure 20:
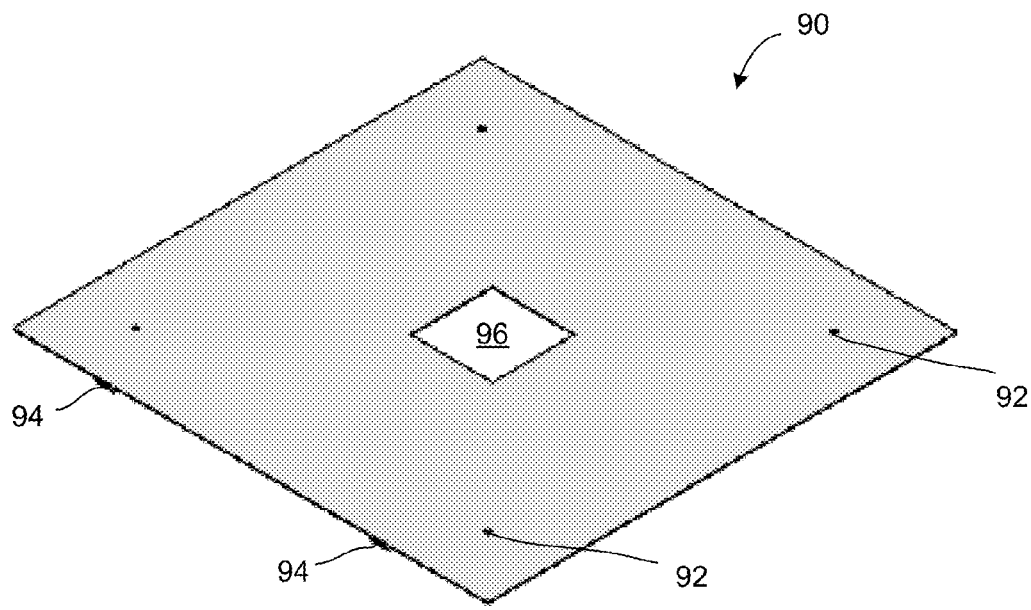
FIG. 20 shows an exemplary mounting member in accordance with one aspect of the disclosed technology.
Figure 21:
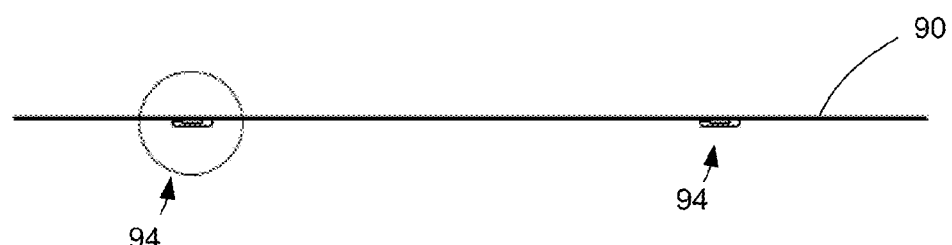
FIG. 21 is a side view of the mounting member of FIG. 20.
Figure 22:
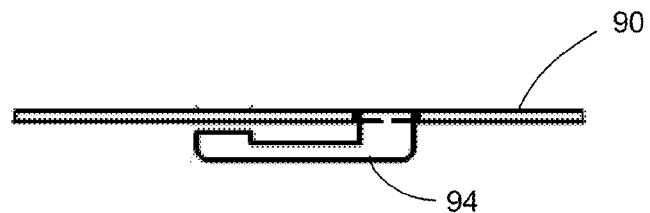
FIG. 22 is an enlarged view of a portion of FIG. 21.

The mounting plate is configured to be secured or otherwise fastened to a mounting surface, such as a wall, ceiling or the underside of a cabinet. For example, as shown in FIG. 20, the mounting plate includes or otherwise defines a number of mounting apertures 92 suitable for receiving appropriate fasteners, such as screws. The mounting plate 90 is configured to cooperate with and releasably engage the bottom assembly 60 (e.g., using a slide-lock mechanism) for mounting the lighting fixture to a flat surface. For example, as shown in FIGS. 20-22, the mounting plate 90 can include a plurality of engagement members 94 (e.g., J-hooks in pairs at opposite edges of the mounting plates). These engagement members 94 can be configured to engage a set of slots at the outer edges of the bottom panel (e.g., via a slide-lock relationship). A user may mount the light fixture to a surface using the mounting plate by first securing the mounting plate to the surface, then engaging the light fixture against the mounting plate.

The mounting plate 90 can be configured to include a central aperture 96 to provide a central wiring entry point. The central aperture 96 can be sized and configured to abut against an exterior junction box (e.g., an already-existing exterior junction box in a ceiling). In accordance with one embodiment, the mounting plate 90 can serve as a cover at the rear surface of the light fixture.

Figure 23:
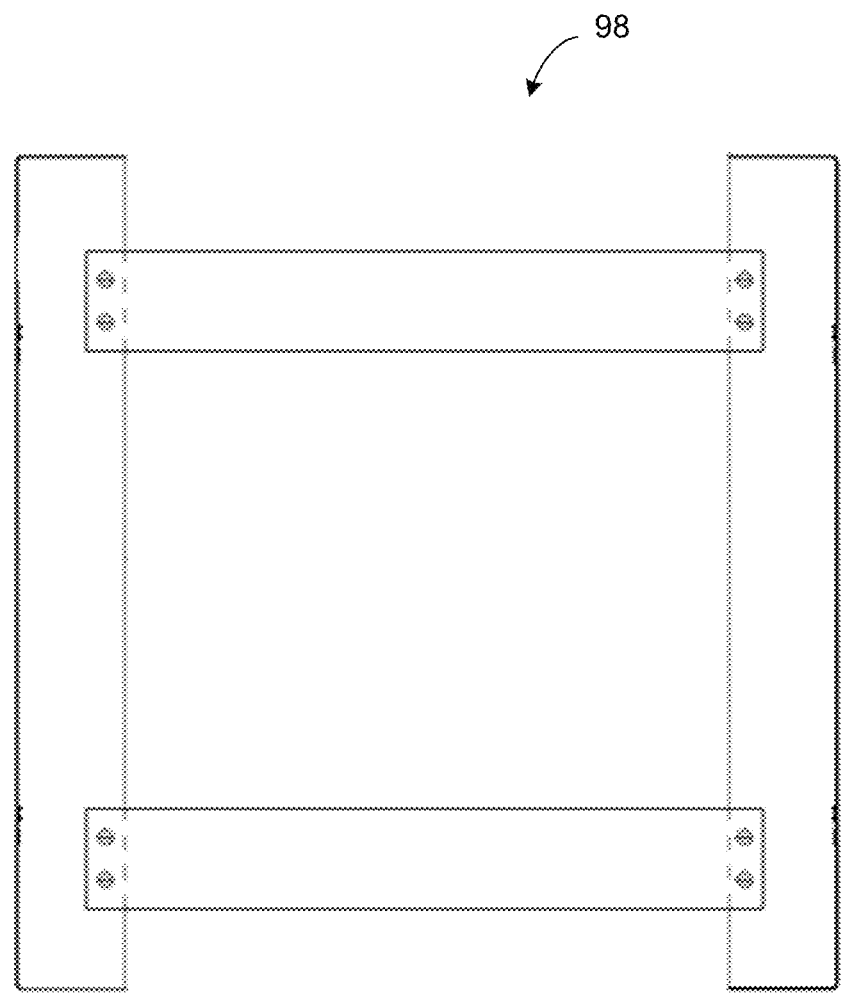
FIG. 23 shows an exemplary mounting member in accordance with one aspect of the disclosed technology.

It will be appreciated that the mounting member may take on other forms. For example, as shown in FIG. 23, the mounting member 98 can be in the form of a multi-piece structure. The mounting member can include engagement members, such as those discussed above. The mounting member 98 also defines a central aperture like the mounting member described above with respect to FIG. 21. It will be appreciated that this configuration can provide a more flexible and lighter-weight mounting option. Other mounting member configurations can be employed without departing from the scope of the disclosed technology.

It will be appreciated that the provision of a mounting member like those described with respect to FIGS. 20-23 allows for a cosmetically-superior surface mounting in that the mounting mechanism will not be visible to the user when the light fixture is mounted.

Figure 11:
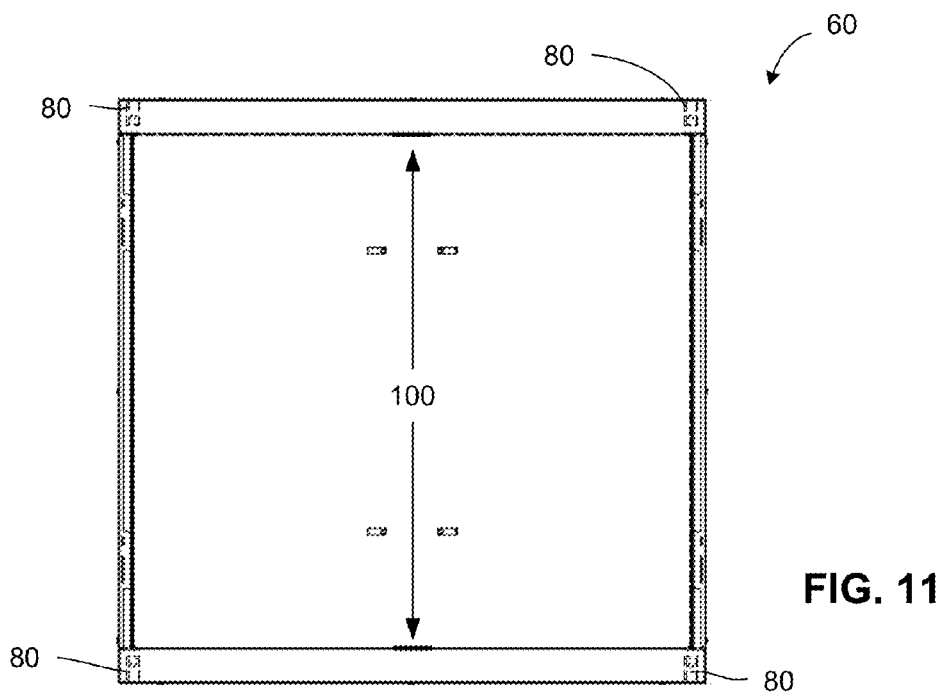
FIG. 11 is a bottom plan view of the bottom frame assembly of FIG. 10.
Figure 12:
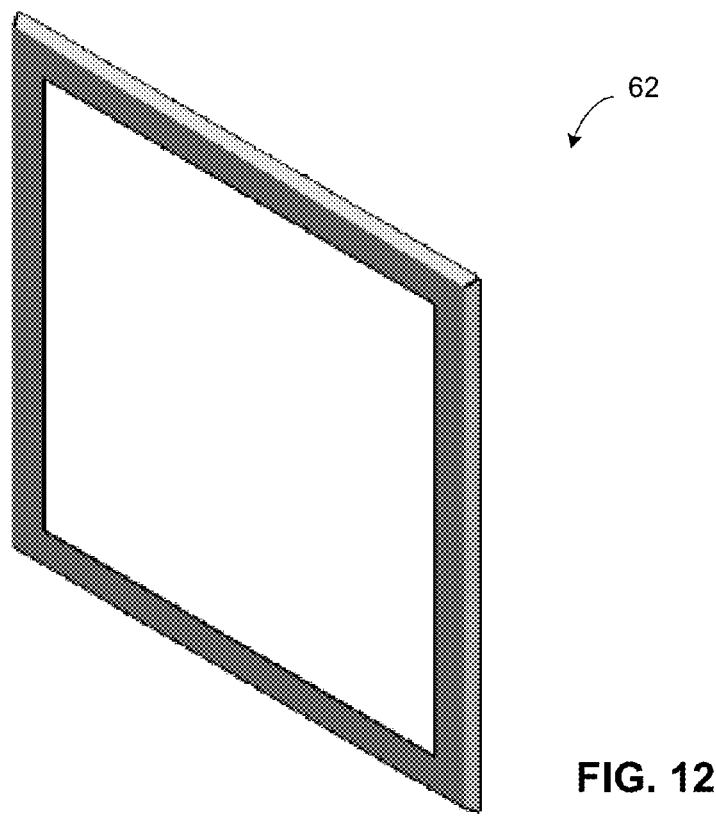
FIG. 12 shows a top frame assembly in accordance with one aspect of the disclosed technology.
Figure 24:
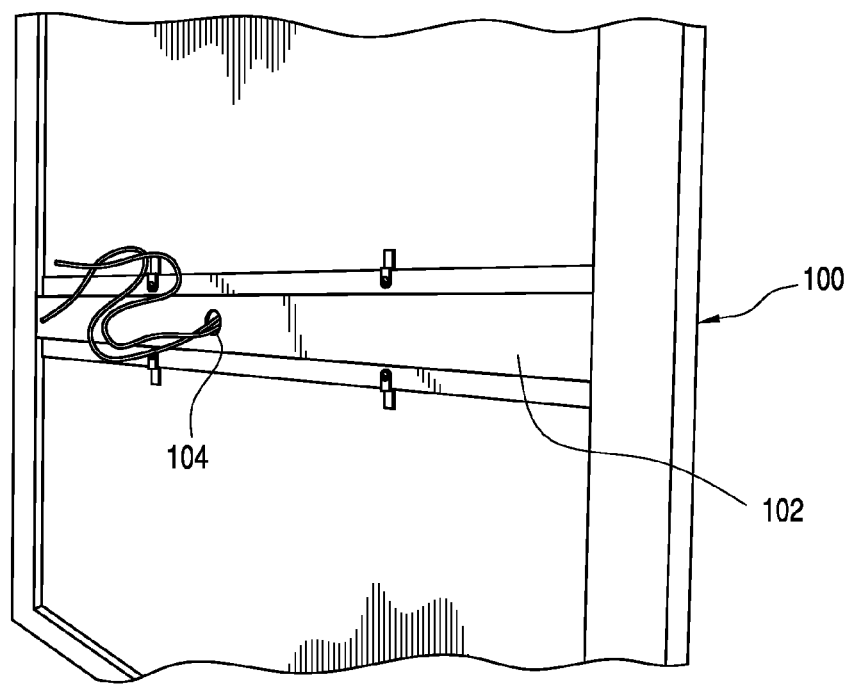
FIG. 24 shows a central wire-way in accordance with one aspect of the disclosed technology.
Figure 25:
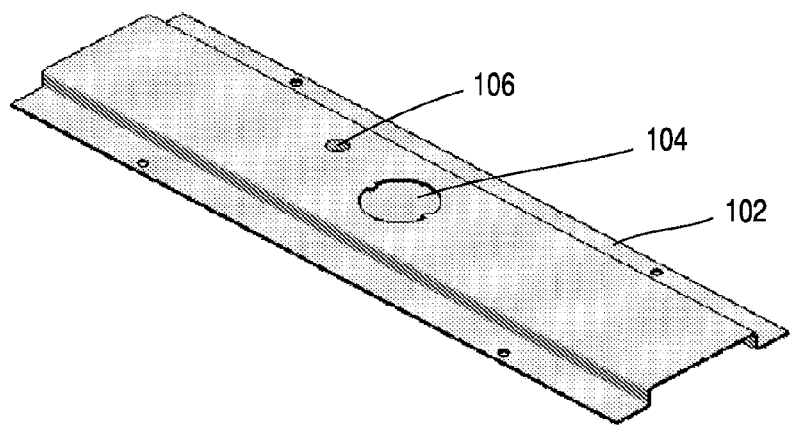
FIG. 25 shows a central wire-way cover plate in accordance with one aspect of the disclosed technology.
Figure 26:
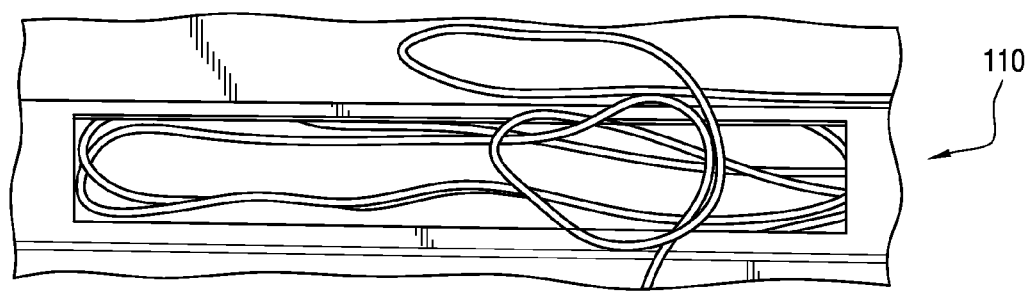
FIG. 26 shows a frame wire compartment in accordance with one aspect of the disclosed technology.
Figure 27:
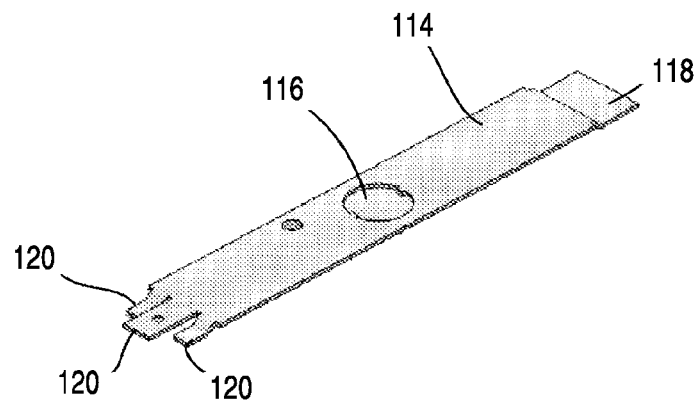
FIG. 27 shows an exemplary knockout bracket in accordance with one aspect of the disclosed technology.
Figure 28:
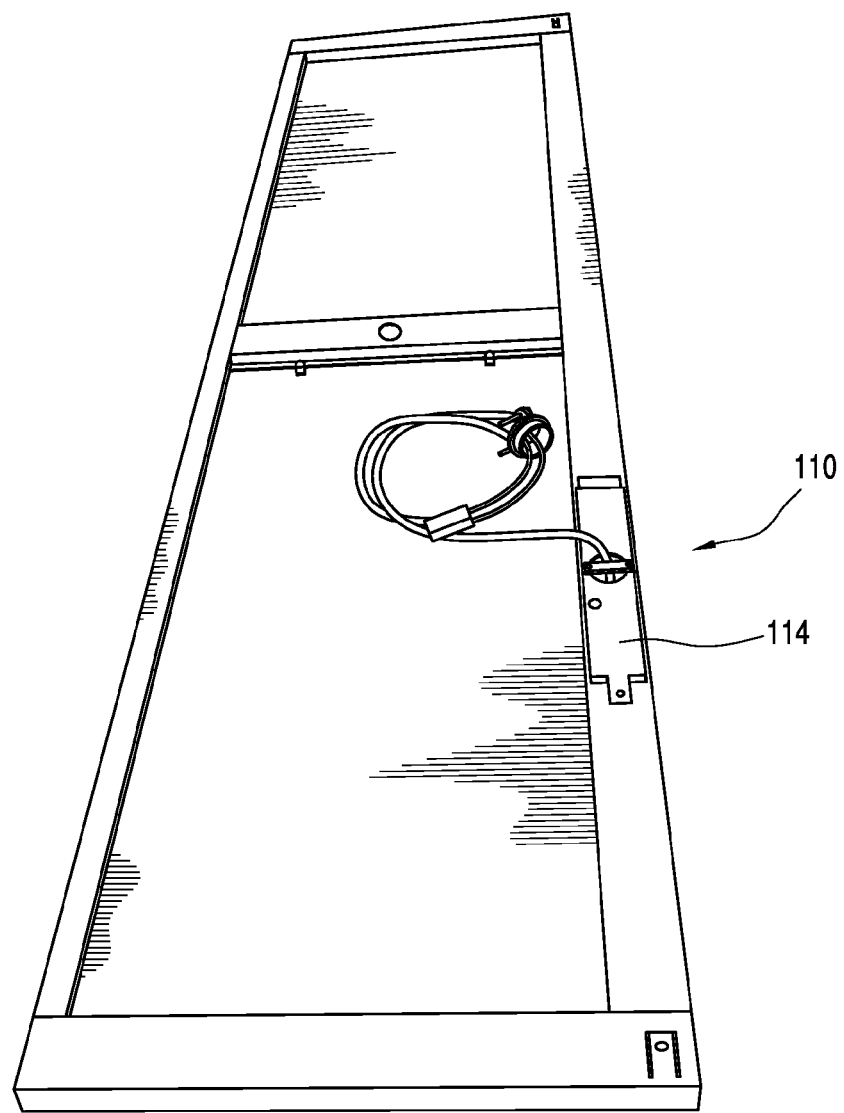
FIG. 28 shows a bottom view of a light fixture includes a wire compartment in accordance with one aspect of the disclosed technology.
Figure 29:
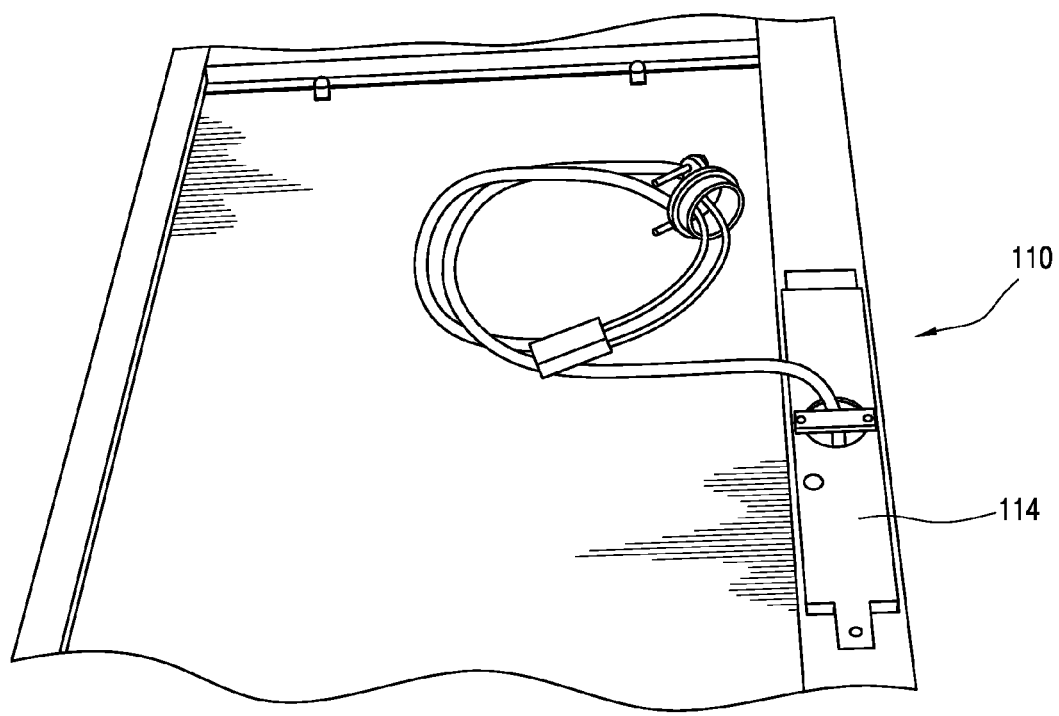
FIG. 29 is an enlarged view of a portion of FIG. 28.
Figure 30:
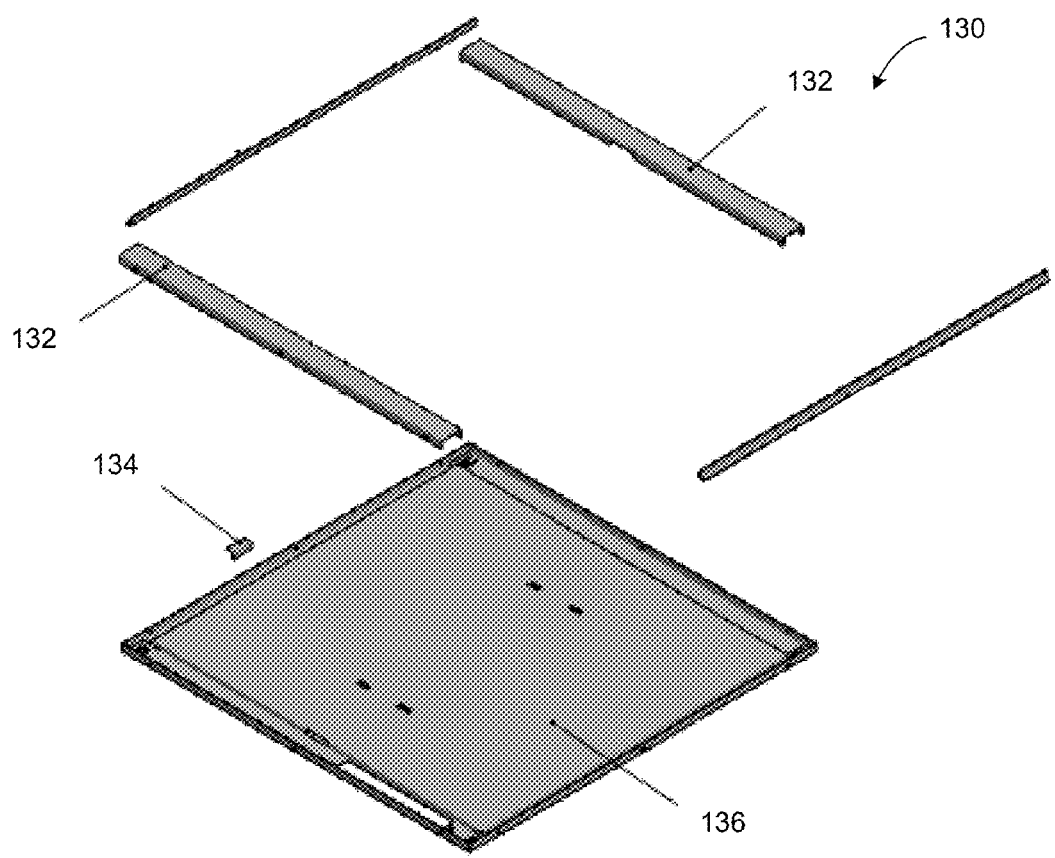
FIG. 30 shows an exploded view of an exemplary bottom frame assembly in accordance with one aspect of the disclosed technology.
Figure 31:
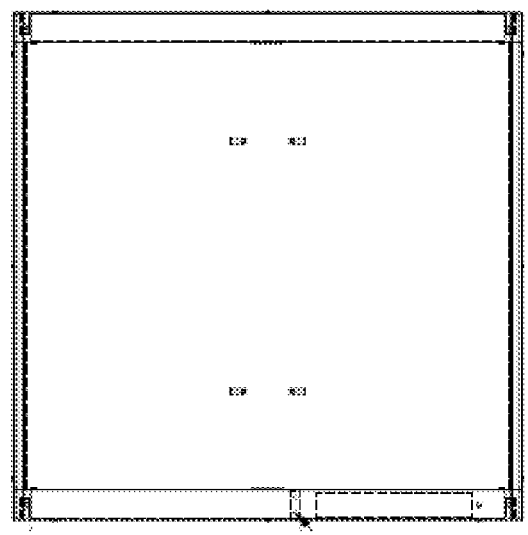
FIG. 31 is a bottom plan view of the bottom frame assembly of FIG. 30.
Figure 32:
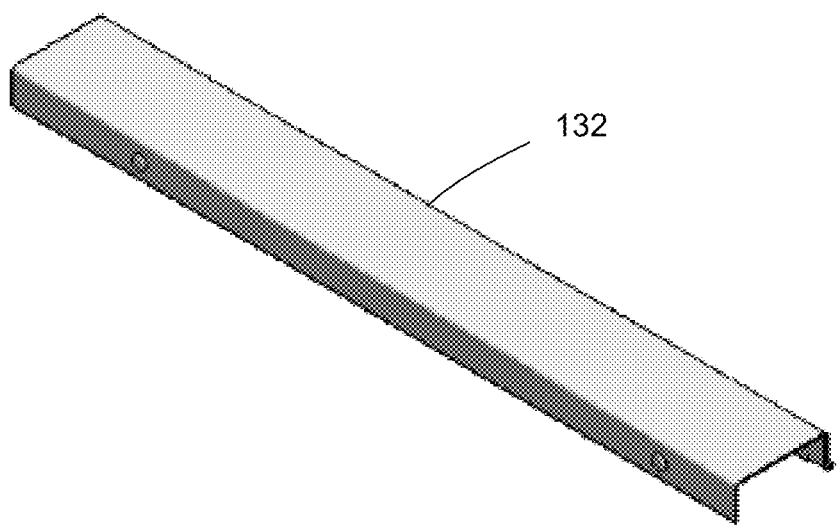
FIG. 32 is an enlarged view of an exemplary inside bracket shown in FIG. 30.
Figure 33:
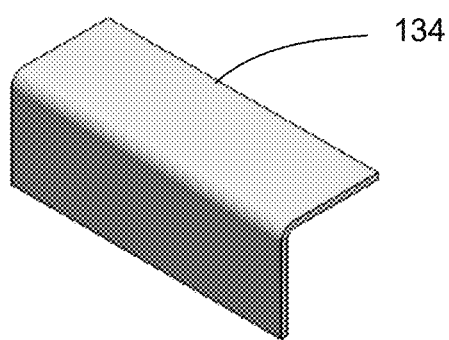
FIG. 33 is an enlarged view of an exemplary divider shown in FIG. 30.

Turning now to FIGS. 24-25, in accordance with another exemplary embodiment, which may be implemented together with one or more of the other embodiments discussed in the present application, the bottom assembly can be configured to include a central wire-way (designated generally as 100) (also see FIG. 11. The central wire-way 100 is configured to provide a location to receive and attach AC input wires, as well as to act as a wire-way channel for routing AC input wires to (and in the case of multiple power supplies, between) a single power supply or multiple power supplies at opposite ends of the central wire-way 100.

The central wire-way 100 can be formed by a protective cover 102 operatively coupled to a back surface of the bottom assembly. In accordance with one embodiment, the central wire-way 100 includes or otherwise defines a central aperture 104, such as a knock-out hole, configured to receive AC input wiring electrically coupled to an external AC source. In accordance with another embodiment, the central wire-way 100 may be provided without a central aperture.

The protective cover 102 can cooperate with the back surface of the bottom assembly to provide a channel to route wiring to or from edges of the frame. For example, a set of AC wires (ground and power) can run through the central wire-way to a power supply at one edge of the frame. In an embodiment in which there are two power supplies at opposite edges of the frame, another set of AC wires can be routed back from that power supply in the opposite direction to provide AC power to the second power supply at the opposite edge of the frame. It will be appreciated that this AC-input wiring arrangement provides design flexibility as it is compatible with light fixture configurations having either a power supply at one edge, or at two opposite edges, of the frame.

In an alternative embodiment, AC wiring within the central wire-way can include a splitter. This would provide two sets of AC power wires than could be routed in both directions from the central aperture to provide AC power to both power supplies without requiring additional wiring between the power supplies.

The central wire-way 100 can include a ground screw 106 to the side of the central aperture 104 to ground AC wires routed through the central wire-way.

Turning now to FIGS. 26-31, in accordance with another exemplary embodiment, which may be combined with one or more of the embodiments discussed in the present application, the frame 14 is configured to include a wire compartment 110, which receives AC wiring at an edge of the frame. The wire compartment 110 can include a shell or other protective structure sized to fit within a portion of the frame. A portion of the back surface of the bottom assembly of the frame can define an aperture 112 approximately corresponding in size and shape to the wire compartment 110 (also referred to as an access aperture). The wire compartment 110 can include a cover (also referred to as a knockout bracket) 114 having a knockout hole (also referred to as a knockout aperture) 116 or other aperture for receiving AC power from an external source.

It will be appreciated that the frame can be configured to include a central wire-way (without a central aperture) to route wiring to or from other edges of the frame.

The knockout bracket 114 provides access to the wire compartment 110, acting like the cover of a junction box in providing an input point for AC cabling exterior to the wiring compartment 110. An example of AC conduit that can be coupled to the light fixture via the knockout bracket is the commonly-used non-metallic sheathed cable supplied using the trade designation Romex™. This type of cable can be secured within the knockout of the knockout bracket using a knockout nut. The knockout bracket 114 can include a grounding screw adjacent the knockout aperture 116.

In accordance with one exemplary embodiment, the knockout bracket 114 can be secured within the access aperture at one end by a downwardly offset flange 118, and at the other end by downwardly offset forks 120, including an apertured tab 122 between the forks and substantially coplanar with the main body of the bracket. In accordance with an exemplary embodiment, to insert the knockout bracket 114 within the cut out (access aperture) at the edge of the bottom panel, the user can insert the flange 118 under the back panel of the flat light adjacent one side of the access aperture; pivot the other end of the bracket into the access aperture cutout; and then slide the forked end 120 of the knockout bracket under the other end of the access aperture cutout, with the aperture tab 122 resting above the panel's edge surface. The knockout bracket 114 then can be secured to the bottom panel assembly using a screw at the aperture tab.

It will be appreciated that the knockout bracket provides a sturdy structure to cover and protect the wiring compartment, and to support the exterior cable as well as AC wiring within the compartment. The knockout bracket can be made of material similar to the material used in the covers of junction boxes, or of any other suitable material.

The central wire-way 100 of FIGS. 24-25 and the edge wire compartment 110 of FIGS. 26-29 provide design options for receiving AC-input wiring and routing the wiring to a power supply within the light fixture. For example, the central wire way can be configured to receive and route 16 gauge wiring or 18 gauge wiring according to the AWG (American Wire Gauge) system. This wiring has a nominal diameter in the range 0.102-0.129 cm, and is rated with an ampacity (ampere capacity for safe current flow) of 10-13 amps, suitable for residential electric power installations, for example the 120 Volts AC service used in North America. As another example, the edge wire compartment with its sturdy, junction box-like configuration, may receive heavier, 12 gauge wiring (AWG), with a nominal diameter on the order of 0.205 cm and a rated ampacity of 23 amps. This wiring is often used in commercial electric power installations, for example the 277 Volts AC service that is common in commercial and industrial lighting in North America.

In accordance with an exemplary embodiment shown in FIGS. 30-33, which may be combined with one or more other embodiments described in this application, the bottom assembly 130 can include, at the two channels for the power supply (defined at least partially by inside bracket 132 and the bottom panel 136), an inside channel divider 134 than divides the channel within one edge of the frame between a compartment for a power supply, and a compartment for the AC-input wiring, isolating these two compartments from one another. In accordance with one embodiment, the divider 134 is located off center within one edge of the frame to provide a longer compartment for the power supply that for the wire compartment.

In this exemplary embodiment, the inside bracket 132 forms an inside channel or shell, which constrains the wiring within the wire compartment, and secures the wire compartment and power supply compartment from exterior forces. The shell can include a slot at its inner wall surface to permit AC wiring to pass from the shell to the central wire-way.

Figure 34:
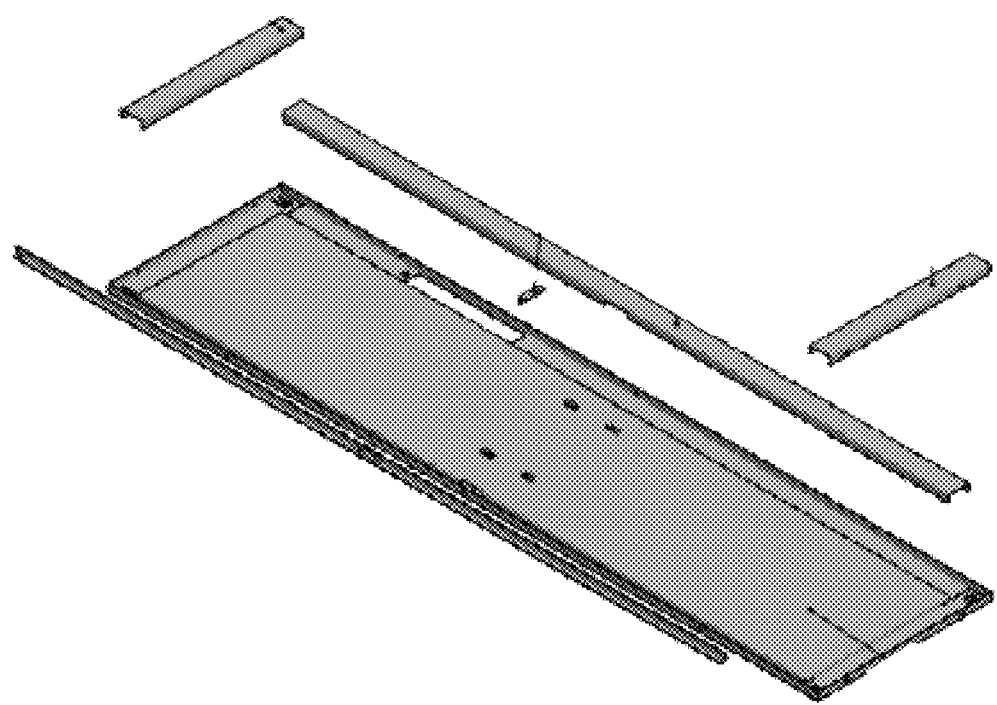
FIG. 34 shows an exploded view of an exemplary bottom frame assembly in accordance with one aspect of the disclosed technology.

While the above features have been described with respect to an exemplary frame dimension of two feet by two feet, it will be appreciated that similar configurations can be used for other dimensions and form factors, such as one foot by one foot, one foot by two feet, one foot by four feet, and the like. For example, FIG. 34 shows an exemplary bottom assembly for a one foot by two feet light fixture. The features of this frame assembly are generally the same as the above-described features of the two feet by two feet embodiment, except for dimensions. In this exemplary embodiment, the LED strips are deployed along the longer edges of the frame, while the power supplies are deployed along the shorter edges of the frame.

Figure 35:
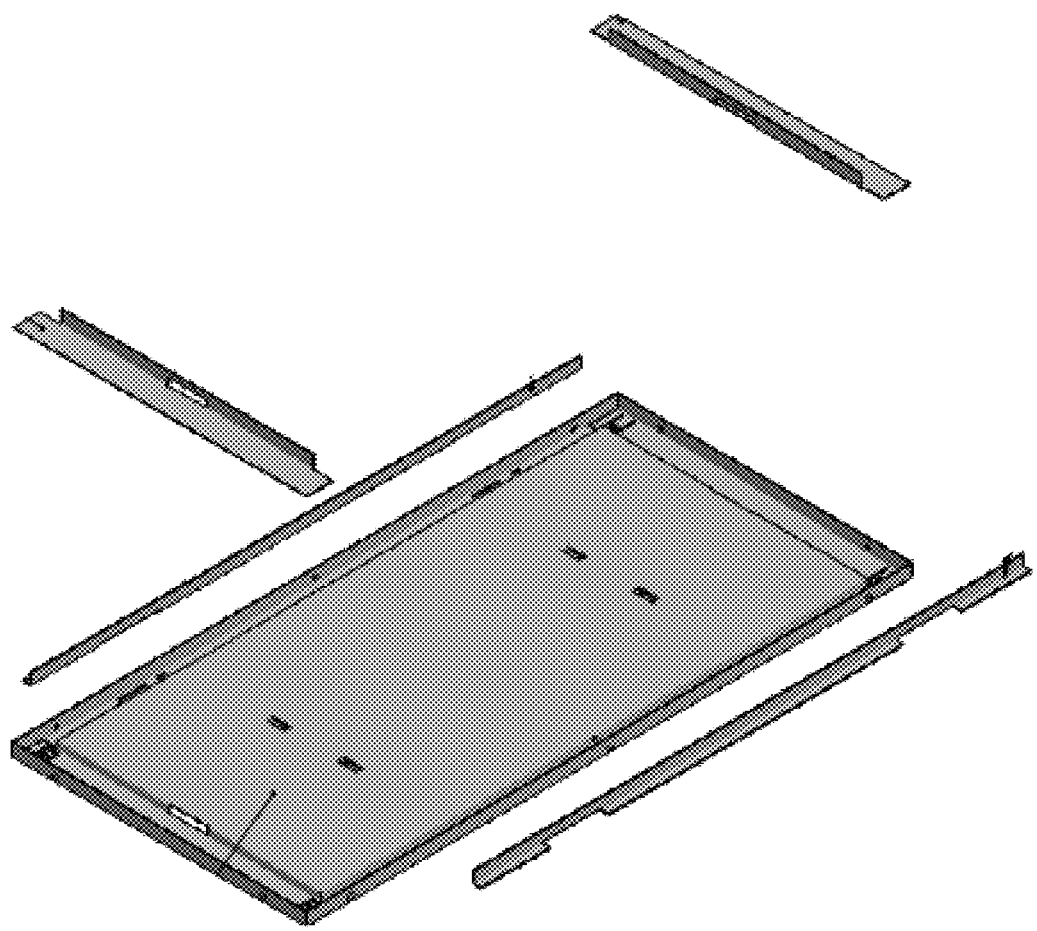
FIG. 35 shows an exploded view of an exemplary bottom frame assembly in accordance with one aspect of the disclosed technology.

FIG. 35, shows the bottom assembly for an exemplary one foot by 4 feet light fixture. In this exemplary embodiment, there are no components at the shorter edges of the bottom panel. The edge brackets at these edges serve only as a structural barrier for the substantially flat LED panel. In this exemplary embodiment, one of the long-dimension edge areas is wider than the opposite long-dimension edge area because one of the edge areas supports two power supplies, while the other edge area supports a pair of LED strips.

Figure 36:
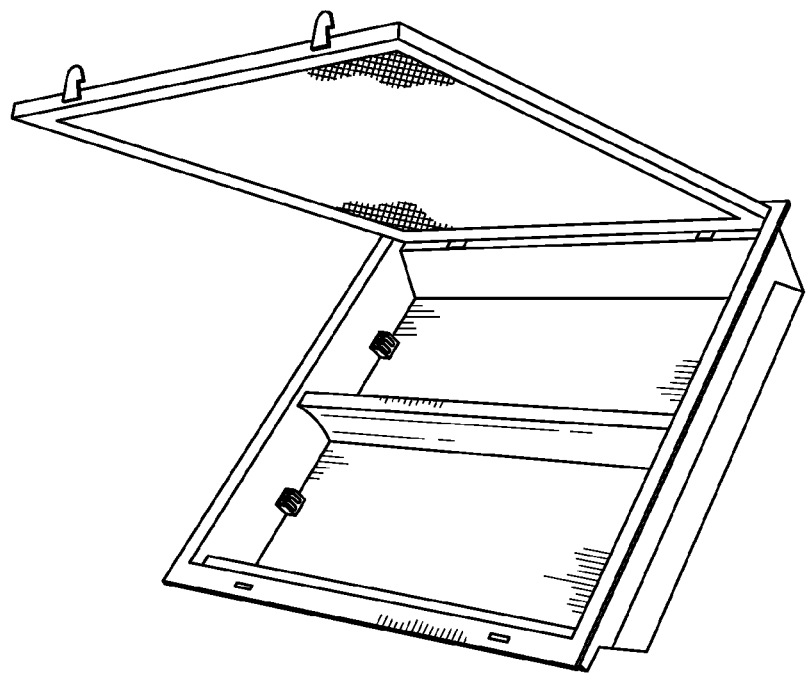
FIGS. 36-40 illustrate a retrofitting method in accordance with one aspect of the disclosed technology.
Figure 37:
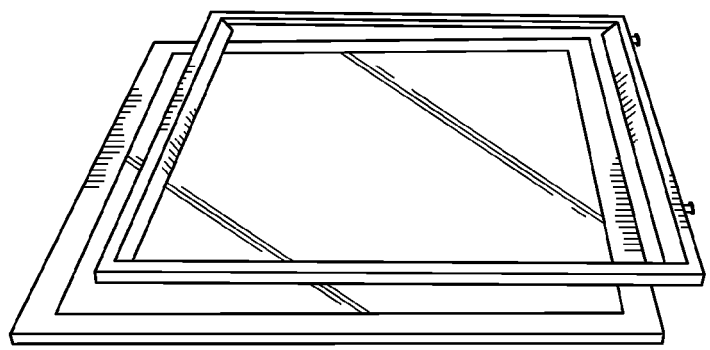
Figure 38:
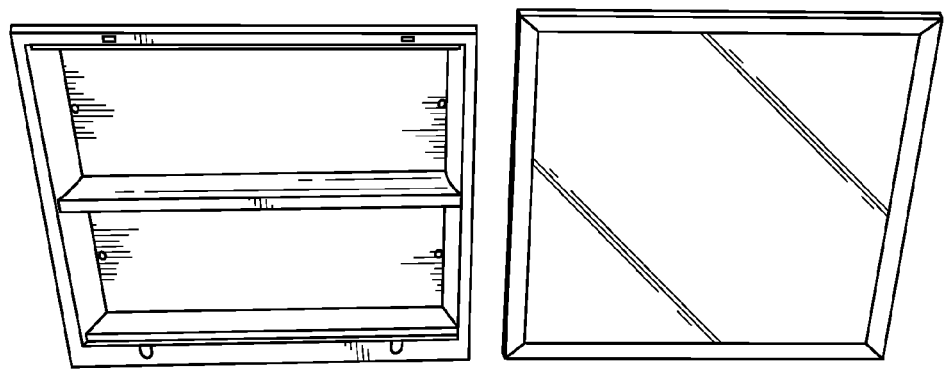
Figure 39:
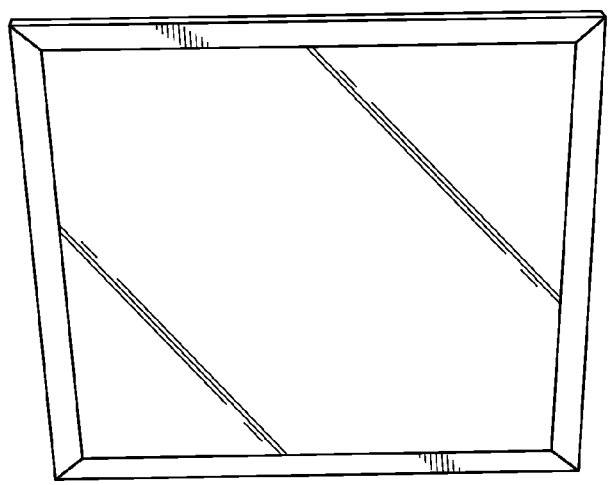
Figure 40:
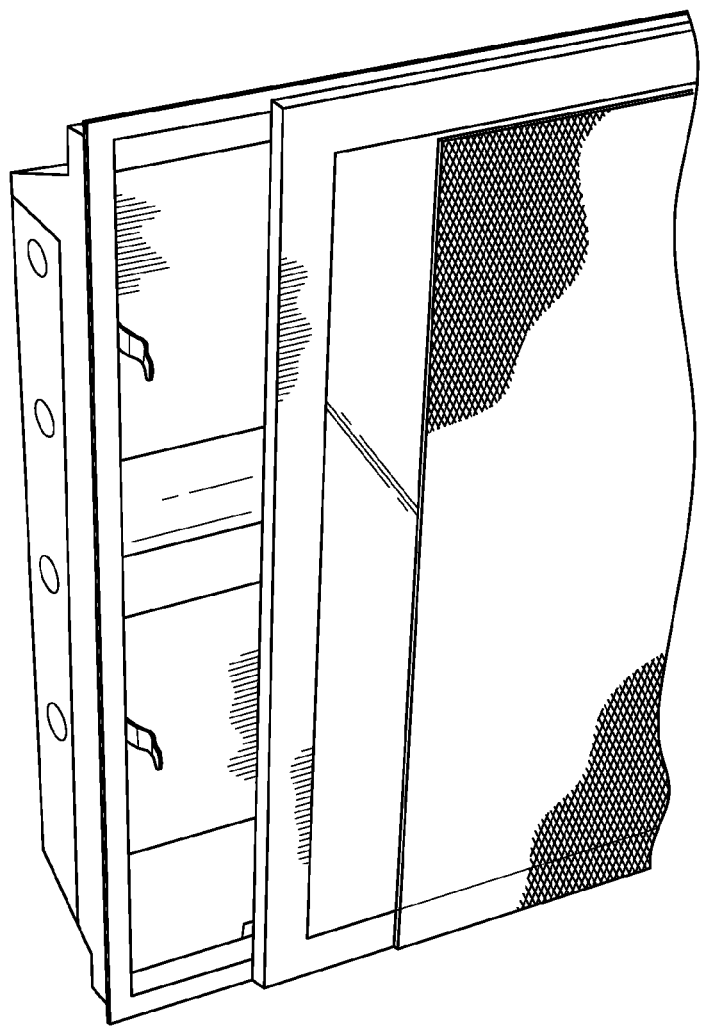
Figure 41:
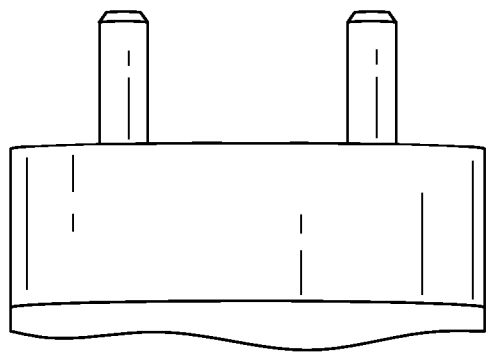
FIG. 41 shows an exemplary electrical connector in accordance with one aspect of the disclosed technology.
Figure 42:
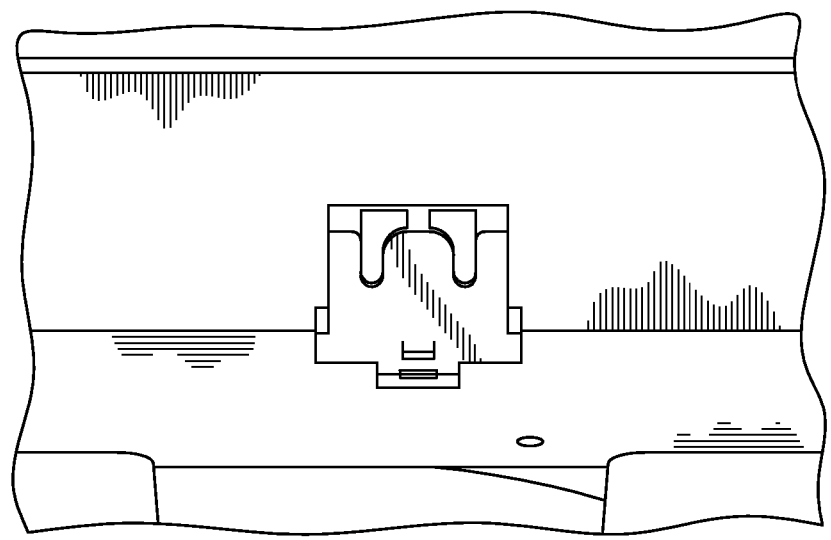
FIG. 42 shows an exemplary fluorescent socket.
Figure 43:
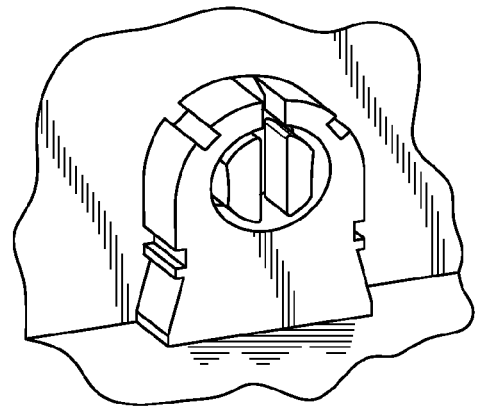
FIG. 43 shows an exemplary fluorescent socket.
Figure 44:
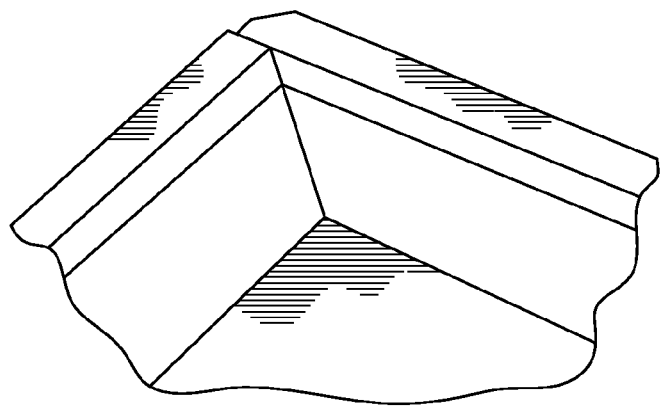
FIGS. 44-46 illustrate a retrofitting method in accordance with one aspect of the disclosed technology.
Figure 45:
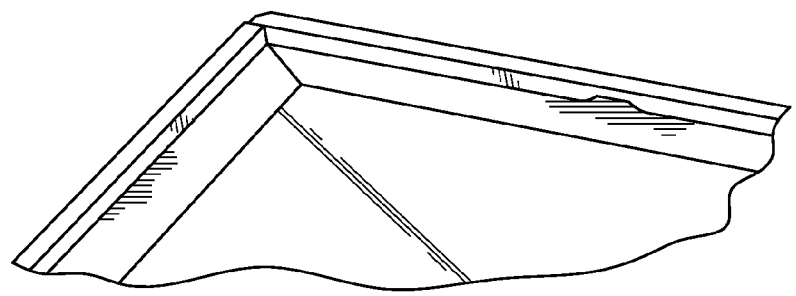
Figure 46:
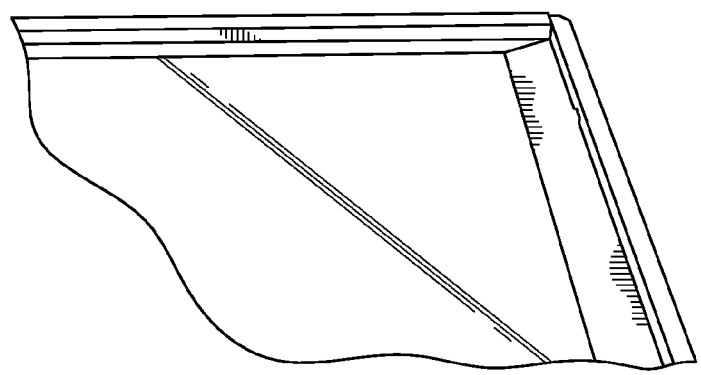
Figure 47:
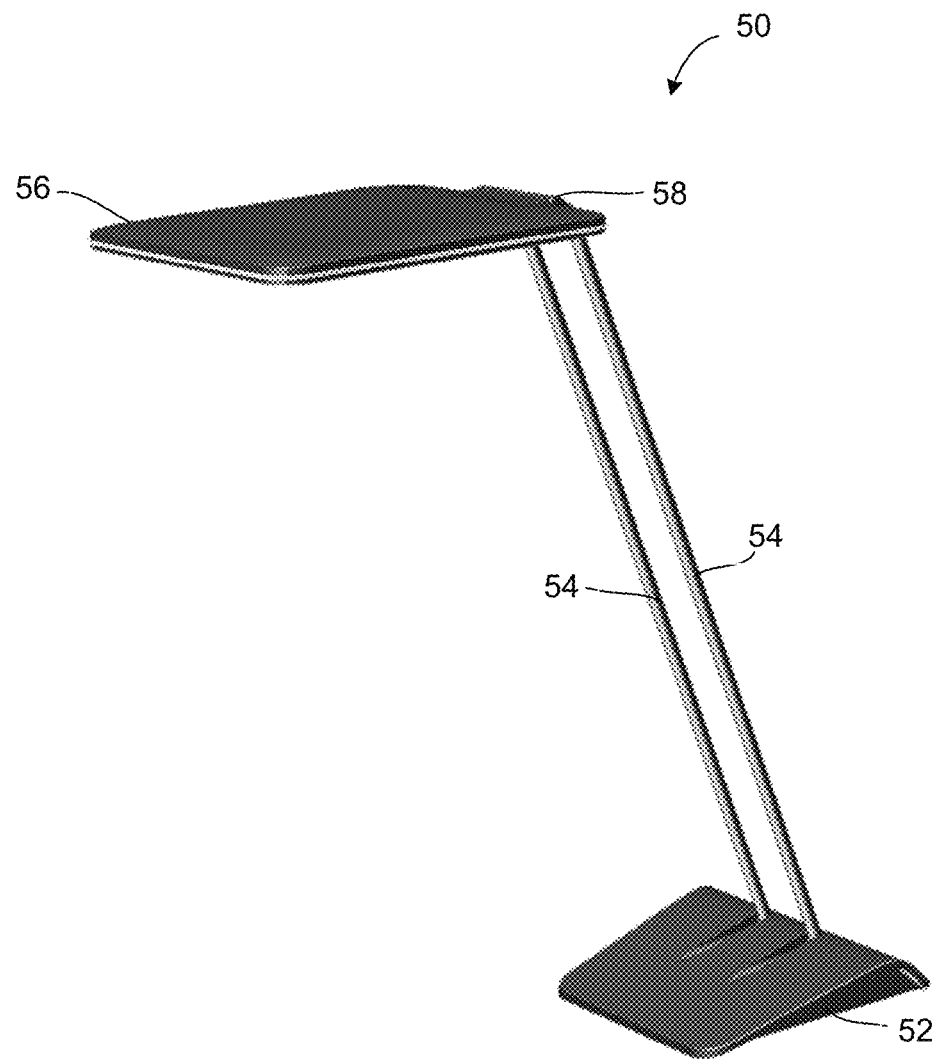
FIG. 47 is a front perspective view of a desk lamp in accordance with one aspect of the disclosed technology.
Figure 48:
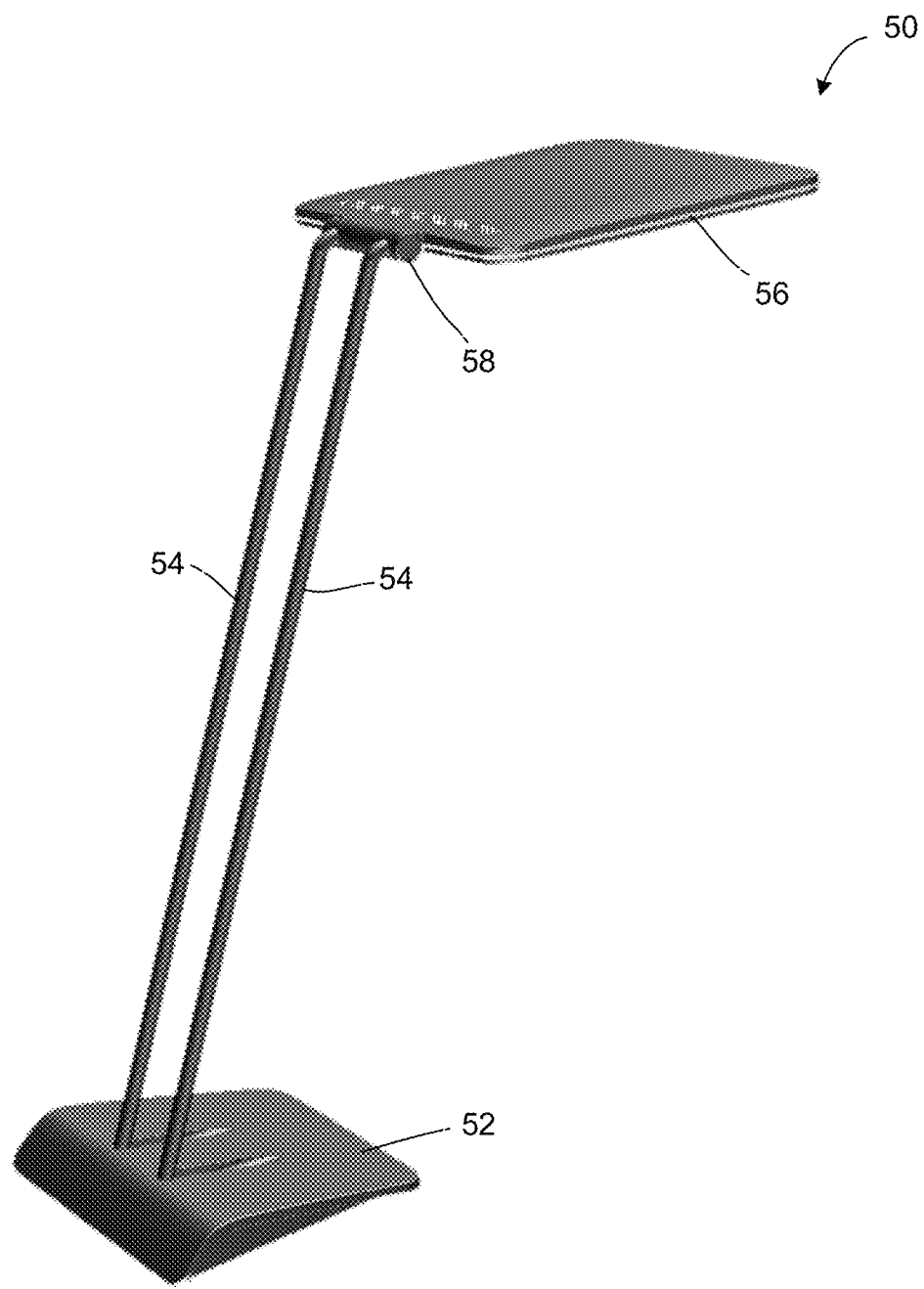
FIG. 48 is a rear perspective view of a desk lamp in accordance with one aspect of the disclosed technology.
Figure 49:
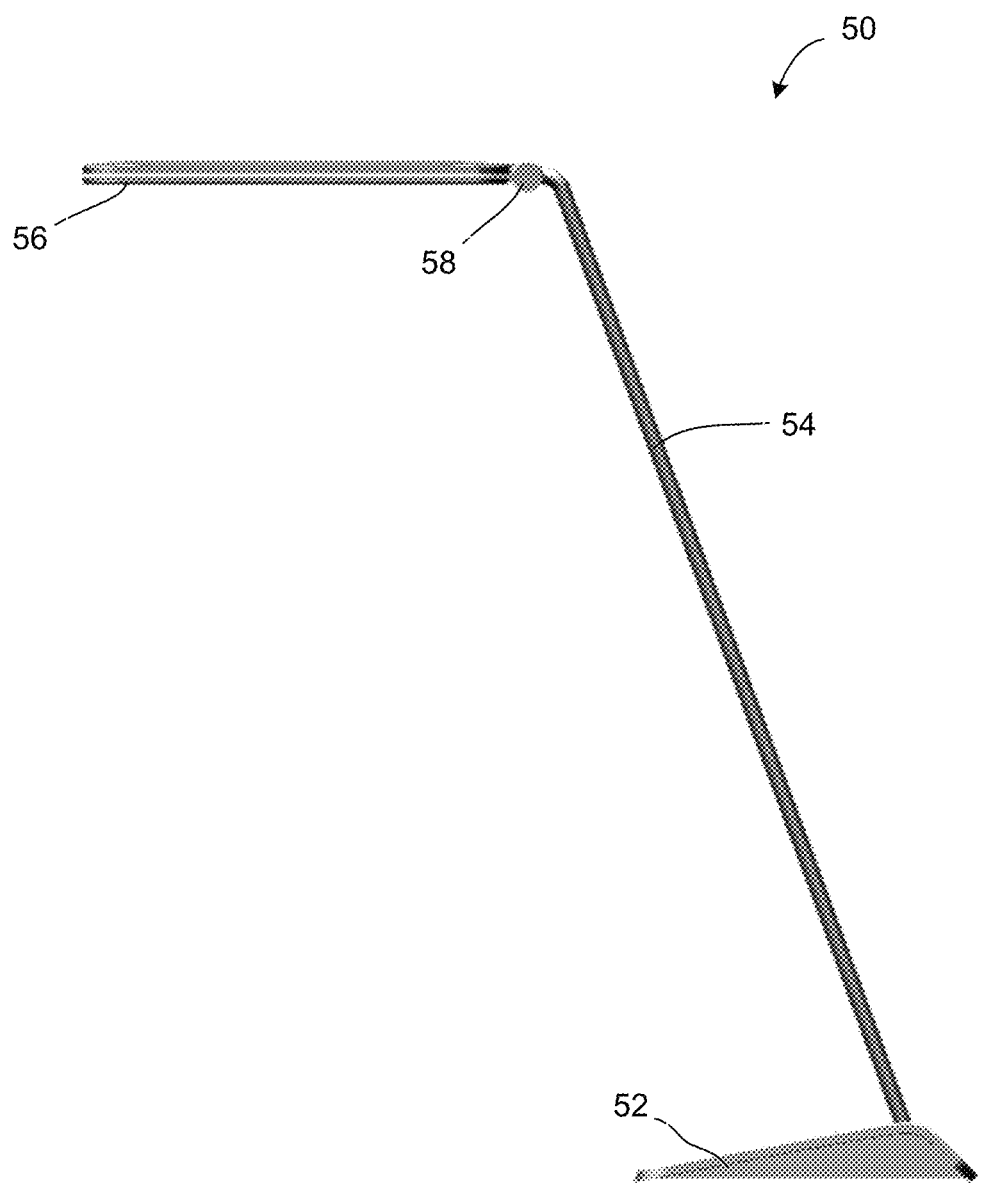
FIG. 49 is a side view of a desk lamp in accordance with one aspect of the disclosed technology.
Figure 50:
FIG. 50 is a front perspective view of a desk lamp in accordance with one aspect of the disclosed technology.
Figure 51:
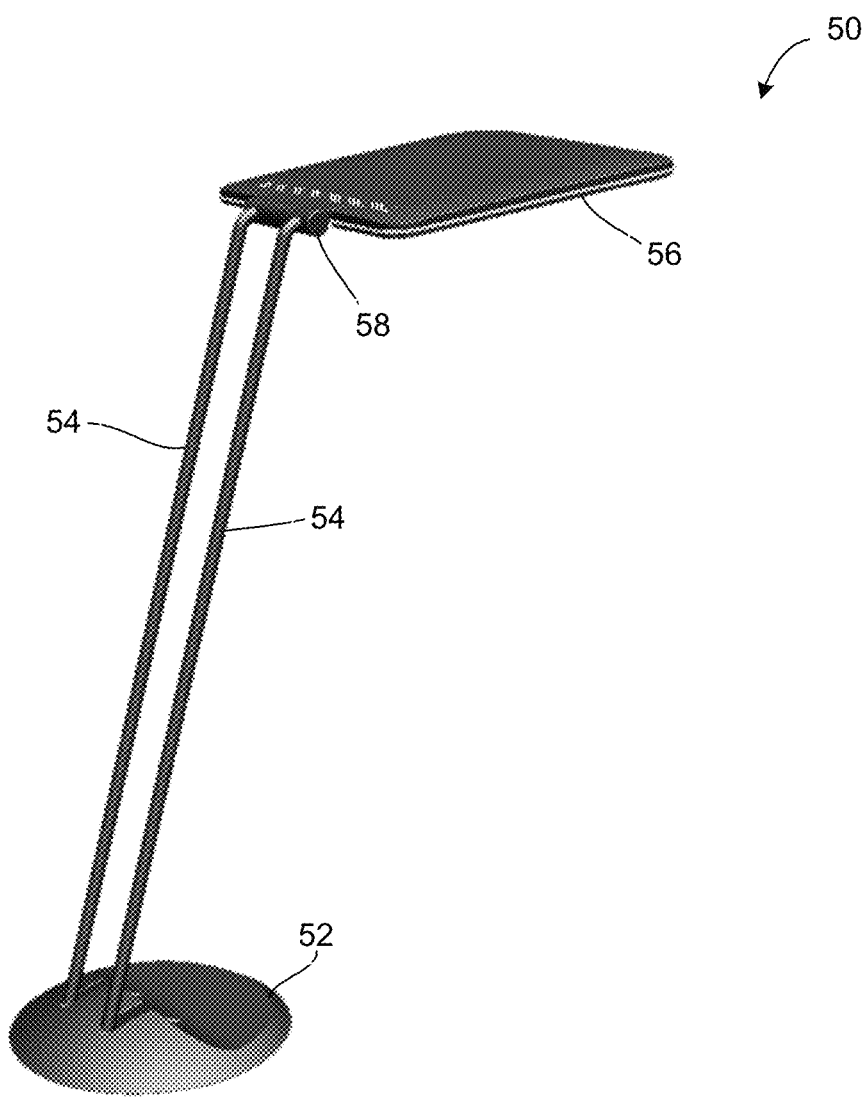
FIG. 51 is a rear perspective view of a desk lamp in accordance with one aspect of the disclosed technology.
Figure 52:
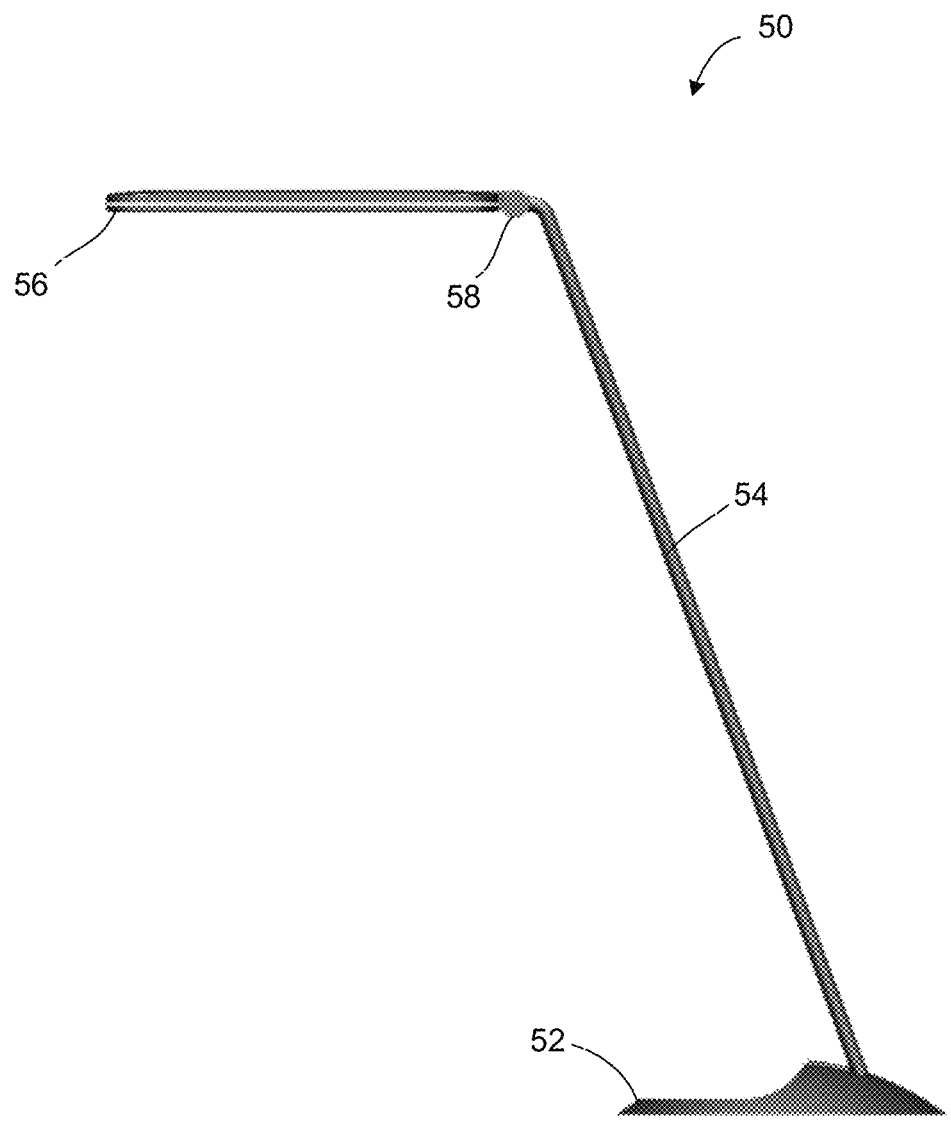
FIG. 52 is a side view of a desk lamp in accordance with one aspect of the disclosed technology.
Figure 53:
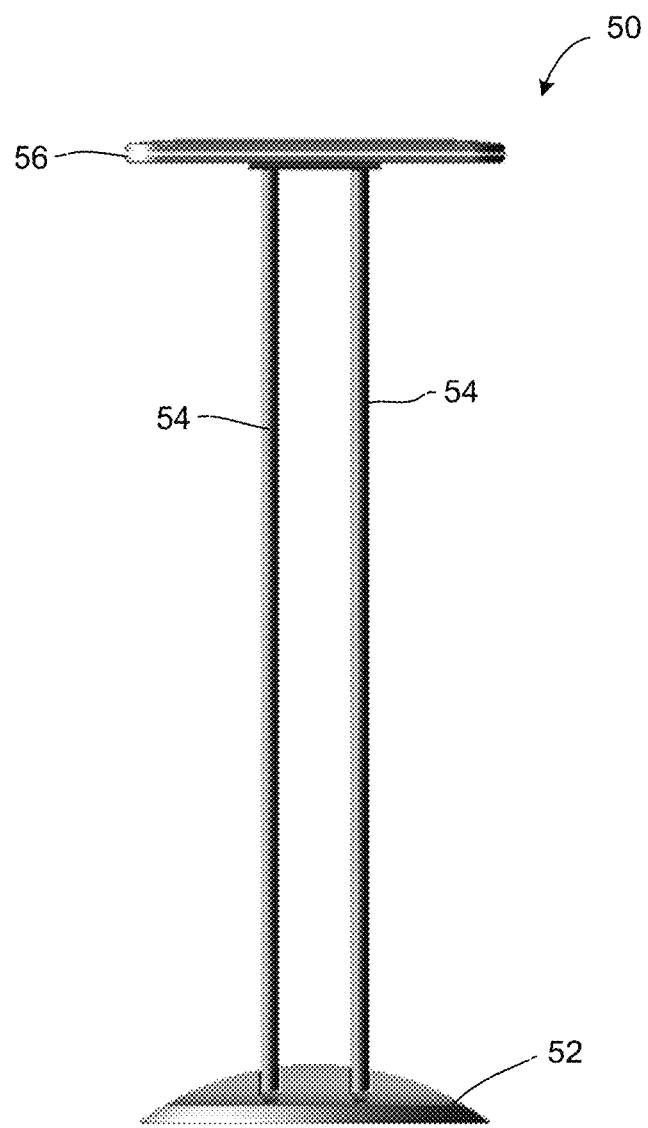
FIG. 53 is a front view of a desk lamp in accordance with one aspect of the disclosed technology.

As is discussed above, the substantially flat LED panel can be incorporated into a number of applications. For example, turning now to FIGS. 36-46, a retrofit lighting kit and a method of retrofitting a fluorescent housing unit, e.g., a fluorescent ceiling light fixture ("troffers"), will be described. It will be appreciated that the retrofit lighting kit is versatile. For example, it can be employed in connection with standard diffuser troffers (see, e.g., FIG. 36) as well as in connection with aluminized reflector troffers.

For purposes of discussion, the fluorescent lighting unit to be retrofit will be understood to include a housing unit, one or more fluorescent sockets and a ballast disposed within the housing unit. Also, for purposes of explanation, the fluorescent housing unit to be retrofit includes an upper extent or upper portion and a lower extent or lower portion. The lower extent of the fluorescent housing unit includes a perimeter of a given shape and size. For example, the perimeter can be approximately two feet by four feet (2 feet×4 feet), as can be found in a standard fluorescent ceiling troffer. In another exemplary embodiment, the perimeter can be one foot by four feet. In yet another exemplary embodiment, the perimeter can be four feet by four feet. It will be appreciated that the retrofitting method is not limited to fluorescent units of any particular size. The substantially flat LED panel can take on any size without departing from the scope of the present invention.

It will be appreciated that while the retrofit kit and method are being described with respect to troffers of different geometries and configurations, a preferred embodiment of the retrofit kit will include appropriate hardware for mounting the retrofit kit to a variety of different troffers, effectively providing a "universal" mounting kit.

The lighting kit (also referred to as a retrofit kit) can include a substantially flat light emitting diode (LED) panel having a shape and size of approximately the given shape and size of the perimeter of the lower extent of the housing unit, power circuitry configured to electrically couple the substantially flat LED panel to a power supply, and at least one engagement member configured to couple the substantially flat LED panel to the housing unit of the fluorescent lighting unit.

The substantially flat LED panel can employ one or more of the features described above. The substantially flat LED panel can include a frame having a shape and size of approximately the given shape and size of the perimeter of the lower extent of the fluorescent housing unit. As is discussed above, the substantially flat LED panel can include a frame as well as a plurality of layers along with edge lighting disposed adjacent to at least one edge of the frame. For example, the substantially flat LED panel can include an optically-transmissive panel, an array of LEDs disposed adjacent at least one edge of the frame and the optically transmissive panel, a diffuser film disposed below the optically-transmissive panel; a brightness enhancement film (BEF) disposed above the optically-transmissive panel, and a reflector disposed above the BEF.

The substantially flat LED panel can include an optically-transmissive panel, e.g., a light guide plate or other polycarbonate or acrylic plate configured to produce even distribution of light received at edges of the optically-transmissive panel. An array of LEDs can be disposed adjacent at least one edge of the frame and the optically transmissive panel. For example, a strip of LEDs may be supported adjacent to one edge of the frame (e.g., disposed within a channel in the frame) and adjacent to one edge of the optically-transmissive panel. Alternatively, the substantially flat LED panel can include strips of LEDs incorporated into or at least partially supported by two edges of the frame. In yet another exemplary embodiment in which the light fixture has a rectangular form factor, the substantially flat LED panel can include strips of LEDs incorporated into or at least partially supported by all four edges of the frame. The LEDs can be sized positioned such that the "emission dimension" of the LED elements has the same thickness or slightly less thickness than the thickness of the light input edge of the optically-transmissive panel, thereby allowing for an extremely thin profile.

In accordance with one embodiment, the at least one engagement member is configured to couple the substantially flat LED panel over the perimeter of the housing unit. For example, the retrofit kit can include clamps to facilitate snap-on mounting over the perimeter of the housing unit.

In accordance with another embodiment, the at least one engagement member is configured to couple the substantially flat LED panel within the perimeter of the lower extent of the housing unit. For example, the retrofit kit can include appropriate tension clamps or fold down clamps to facilitate mounting within the perimeter of the lower extent of the housing unit. Alternatively, the frame of the substantially flat LED panel can be sized to snap into the perimeter of the lower extent of the housing unit without use of additional securement, such as clamps. In this embodiment, the perimeter of the lower extent of housing unit can include a channel having a thickness, with the substantially flat LED panel having a thickness approximately equal to the thickness of the channel around the perimeter of the lower extent of the fluorescent housing unit.

In one embodiment, the at least one engagement member is configured to hingedly mount the substantially flat LED panel to the lower extent of the housing unit. In another embodiment, the housing unit can include a cover hingedly connected to a body, and the at least one engagement member can be configured to couple the substantially flat LED panel to the cover such that the substantially flat LED panel is hingedly mounted to the body of the fluorescent housing unit via the cover. In this embodiment, the cover can define a channel around a perimeter of the cover, the channel having a thickness, wherein the substantially flat LED panel has a thickness approximately equal to the thickness of the channel around the perimeter of the cover.

In accordance with another exemplary embodiment, the fluorescent lighting unit can include a reflector grid connected to the housing unit, wherein engagement member is configured to couple the substantially flat LED panel over the reflector grid. Alternatively, the fluorescent lighting unit can include a reflector grid connected to the housing unit, wherein engagement member is configured to couple the substantially flat LED panel to the housing unit above the reflector grid.

The lighting kit can further include power circuitry in the form of a block transformer. As is described more fully below, the block transformer can electrically couple the substantially flat LED panel to the power supply associated with the fluorescent lighting unit by bypassing the ballast associated with the fluorescent housing unit. Alternatively, the power circuitry can be configured to electrically couple the substantially flat LED panel to the ballast associated with the fluorescent lighting unit. In accordance with another embodiment, the power circuitry includes a transformer incorporated into the frame of the substantially flat LED panel.

In one embodiment, the power circuitry can include at least one electrical connector configured to electrically connect the substantially flat LED panel to at least one fluorescent socket. For example, the electrical connector can be configured to include a pair of prongs configured to snap into the fluorescent socket (see, e.g., FIGS. 41 and 42). Alternatively, the electrical connector can be configured to couple to a fluorescent socket where the connector is inserted and turned to lock into place (see, e.g., FIG. 43).

The retrofit lighting kit described above can be employed in connection with a method of retrofitting a fluorescent housing unit (e.g., a troffer) having an upper extent and a lower extent, where the lower extent has a perimeter of a given shape and size. The retrofitting method can include providing a substantially flat light emitting diode (LED) panel, the substantially flat LED panel having a shape and size of approximately the given shape and size of the perimeter of the lower extent of the fluorescent housing unit. The substantially flat LED panel can be electrically coupled to a power supply associated with the fluorescent housing unit, and the substantially flat LED panel can be mounted to the fluorescent housing unit.

As is described above, the substantially flat LED panel includes a frame having a shape and size of approximately the given shape and size of the perimeter of the lower extent of the fluorescent housing unit and the substantially flat LED panel can be mounted over the perimeter of the fluorescent housing unit (e.g., using suitable clamps, such as fold down clamps or tensioner clamps). Alternatively, the mounting step can include mounting the substantially flat LED panel within the perimeter of the lower extent of the fluorescent housing unit. In this embodiment, the perimeter of the lower extent of fluorescent housing unit can include a channel having a thickness, with the substantially flat LED panel having a thickness approximately equal to the thickness of the channel around the perimeter of the lower extent of the fluorescent housing unit.

In an alternative embodiment where the fluorescent housing unit includes a cover hingedly connected to a body, the cover including a diffuser and/or a lens (see, for example, FIGS. 36-40), mounting can include removing the diffuser and/or lens from the cover and mounting the substantially flat LED panel to the cover, such that the substantially flat LED panel is hingedly mounted to the body of the fluorescent housing unit via the cover. In this embodiment, the cover can define a channel around a perimeter of the cover, the channel having a thickness, wherein the substantially flat LED panel has a thickness approximately equal to the thickness of the channel around the perimeter of the cover.

In a case where the fluorescent housing unit includes a reflector grid connected to a body, the step of mounting can include removing the reflector grid and mounting the substantially flat LED panel to the lower extent of the body of the fluorescent housing unit. Alternatively, mounting can include removing the reflector grid and mounting the substantially flat LED panel to the body of the fluorescent housing unit and replacing the reflector grid such that the substantially flat LED panel is positioned above the reflector grid.

The step of electrically coupling the substantially flat LED panel to a power supply associated with the fluorescent housing unit can be accomplished in a number of ways. For example, electrically coupling can include removing a ballast associated with the fluorescent housing unit and electrically coupling the substantially flat LED panel to the power supply via a block transformer. Alternatively, electrically coupling can include electrically coupling the substantially flat LED panel to the power supply via one or more fluorescent light sockets associated with the fluorescent housing unit (e.g., where the substantially flat LED panel includes one or more connectors configured to electrically connect with the fluorescent light sockets associated with the fluorescent housing unit). In accordance with yet another embodiment, electrically coupling can include electrically coupling the substantially flat LED panel to a ballast associated with the fluorescent housing unit (e.g., via an external block transformer associated with the LED panel or via a transformer or other LED driver incorporated into the frame of the substantially flat LED panel).

Turning now to FIGS. 47-55, another exemplary embodiment of the disclosed technology is provided. In accordance with this exemplary embodiment, the substantially flat LED panel described above can be incorporated into a desk lamp (50). The desk lamp (50) can include a base (52), at least one support (54) coupled to the base (52) and a substantially flat LED panel (56) operatively coupled to the at least one support (54). In the illustrated embodiment of FIGS. 47-50, the desk lamp (50) includes a rectangular base (52) operatively coupled to a pair of supports (54) extending upward from the rectangular base (52). The supports (54) are operatively coupled to the substantially flat LED panel (56) (e.g., by a hinge mechanism (58) that allows the substantially flat LED panel (56) to rotate relative to the supports (54)).

In the illustrated embodiment, the substantially flat LED panel (56) has a generally square form factor (e.g., a square of about six inches by about six inches), however, the substantially flat LED panel (56) may take on a variety of form factors and sizes without departing from the scope of the disclosed technology. For example, the substantially flat LED panel (56) may be rectangular, circular, elliptical, or the like. In addition, the base (52) may take on a variety of geometries, such as the rectangular base illustrated in FIGS. 47-50 or the substantially circular base illustrated in FIGS. 50-53. The supports (54) may be fixedly coupled to the base or, as is described more fully below, the supports (54) may be rotationally coupled to the base (52) allowing for greater adjustment as well as secure and efficient packaging of the desk lamp.

In accordance with one exemplary embodiment, the desk lamp can include LED drive circuitry operatively coupled to the substantially flat LED panel. The LED drive circuitry may be housed or otherwise supported within the base. Alternatively, the LED drive circuitry may be housed or otherwise supported within a frame associated with the substantially flat LED panel.

The substantially flat LED panel can employ one or more of the features discussed above with respect to FIGS. 1-9. For example, the substantially flat LED panel can include a frame and a plurality of LEDs positioned about at least a portion of the frame. In the case of a square or rectangular frame, the plurality of LEDs can be positioned along one side of the frame or more than one side of the frame. In the case of a round or elliptical frame, the plurality of LEDs can be disposed along at least a portion of the circumference or perimeter of the frame.

In accordance with one embodiment, the substantially flat LED panel includes an optically-transmissive panel, a frame surrounding the optically-transmissive panel, an array of LEDs disposed adjacent at least one edge of the frame and the optically transmissive panel, a diffuser film disposed below the optically-transmissive panel, a brightness enhancement film (BEF) disposed above the optically-transmissive panel, and a reflector disposed above the BEF. In one embodiment, the substantially flat LED panel can have a thickness less than about 1.0 inches. In another embodiment, the substantially flat LED panel can have a thickness of less than about 0.5 inches.

Also, as discussed above with respect to FIGS. 1-9, the substantially flat LED panel can include a plurality of LEDs having outputs of various colors and/or color temperatures. For example, the substantially flat LED panel can include white LEDs having output of a predetermined color temperature. In accordance with another embodiment, the substantially flat LED panel can include a plurality of colored LEDs (e.g., LEDs having red output, green output and blue output), where the colored LEDs are configured to cooperate to produce white light when energized. In the case of a plurality of colored LEDs, the desk lamp can include LED driver circuitry that is configured to selectively energize the colored LEDs to provide light output of variable color temperature. The control circuitry also can be configured to control the intensity of the light emitted by the substantially flat LED panel, thereby providing a dimming function.

In accordance with one embodiment, the substantially flat LED panel can include one or more strips of LEDs disposed adjacent and least one edge of the frame, where each strip of LEDs is removably coupled to the power circuitry via a suitable electrical connector. It will be appreciated that this configuration allows for the easy replacement of one or more strips of LEDs within the substantially flat LED panel. For example, in the case of LED failure or burnout, the strip of LEDs could be easily replaced without replacing the entire substantially flat LED panel. In addition, the color output of the desk lamp could be altered by swapping out one or more of the LED strips.

Figure 54:
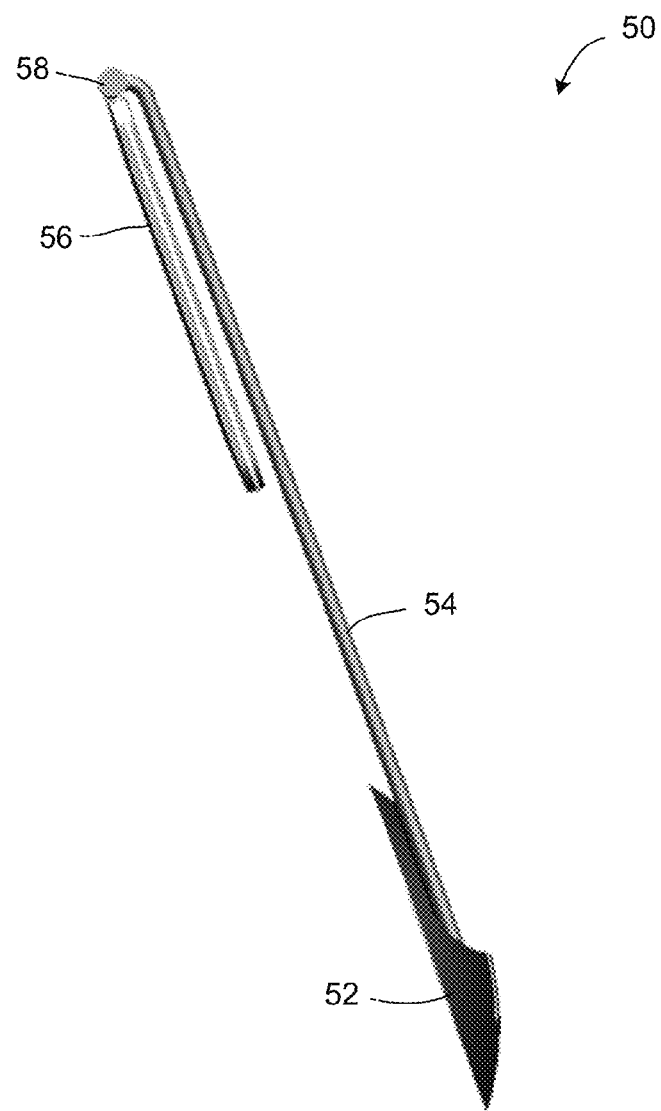
FIG. 54 is a side view of a desk lamp in a folded configuration in accordance with one aspect of the disclosed technology.
Figure 55:
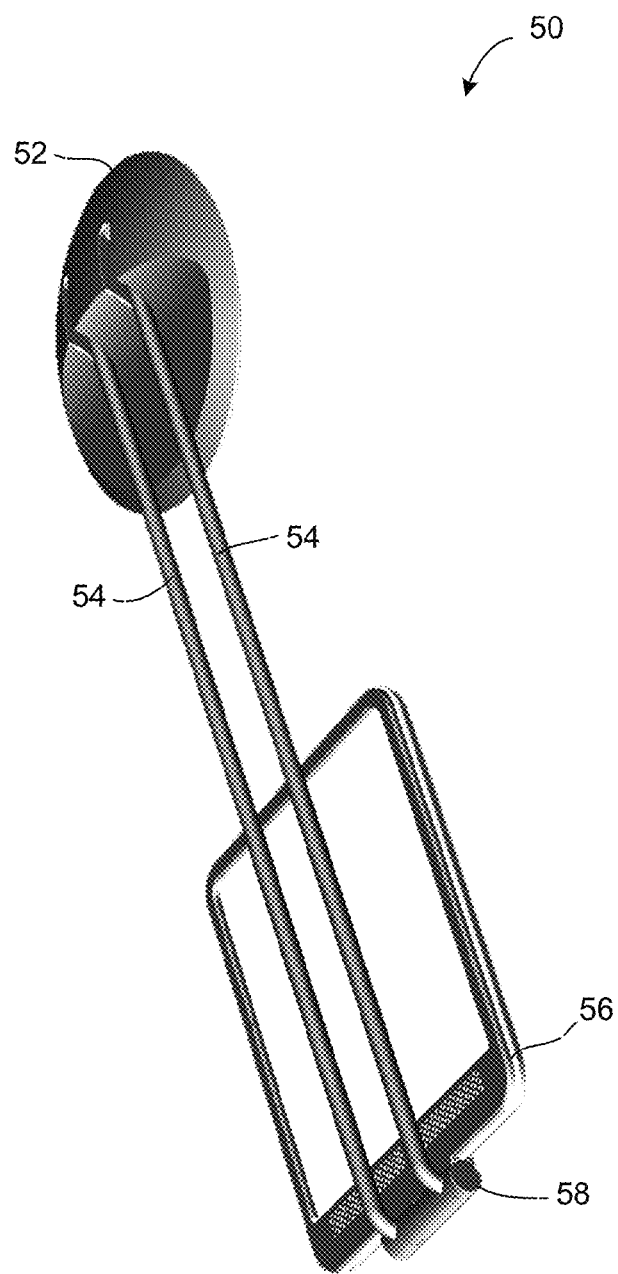
FIG. 55 is a side view of a desk lamp in a folded configuration in accordance with one aspect of the disclosed technology.

Turning now to FIGS. 54-55, an embodiment where the substantially flat LED panel (56) is hingedly coupled to a pair of supports (54) (e.g., by a hinge mechanism (58)), which are hingedly coupled to the base is illustrated. As can be seen, this embodiment allows for efficient and secure packaging, storage, and/or transportation of the desk lamp because the desk lamp can be folded into a relatively flat configuration.

As is discussed above, the provision of a light fixture making use of a substantially flat LED panel provides for great versatility in applications ranging from a standalone lighting unit, to a retrofit lighting kit to a desk lamp. Examples of other applications include, but are not limited to, stairwell lighting, emergency lighting (optionally including a battery backup), task lighting for cubicles, under counter lighting (e.g., kitchen work areas and within china cabinets), home or commercial garage lighting, lighting for retail shelving, aquarium lighting, and the like. The provision of a substantially flat LED panel having edge lighting allows for thin panels of flexible length and width providing uniform light output.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A light fixture comprising:
   a frame including a bottom assembly and a top assembly coupled to the bottom assembly, the bottom assembly and the top assembly cooperating to form a plurality of channels within the frame;
   a substantially flat light emitting diode (LED) panel disposed within the frame; and
   power circuitry disposed within the frame or adjacent the frame, the power circuitry being configured to electrically couple the substantially flat LED panel to an external power supply;
   wherein the bottom assembly includes a back surface and a plurality of mounting tabs on the back surface, wherein the mounting tabs are movable between (i) a first unextended position where the mounting tabs are substantially co-planar with the back surface, (ii) a first extended position where the mounting tabs extend out at an angle of approximately 90 degrees relative to the back surface, and (iii) a second extended position where the mounting tabs extend out at an angle of approximately 180 degrees relative to the back surface.

2. The light fixture of claim 1, wherein the mounting tabs are integrally formed with the back surface of the bottom assembly.

3. The light fixture of claim 1, wherein the mounting tabs are formed as a cut-out from the back surface of the bottom assembly.

4. The light fixture of claim 1, wherein the mounting tabs are operatively coupled to the back surface of the bottom assembly.

5. The light fixture of claim 1, wherein the mounting tabs define an aperture configured to receive a fastener.

6. The light fixture of claim 1, wherein the mounting tabs are configured to remain in position when moved to the first extended position or when moved to the second extended position.

7. The light fixture of claim 1,
   wherein said substantially flat light emitting diode (LED) panel has a thickness less than about 1.0 inches.

8. The light fixture of claim 1, wherein the substantially flat LED panel includes a plurality of LEDs disposed adjacent at least one edge of the frame.

9. The light fixture of claim 1, wherein the frame of the light fixture has a thickness of less than about 0.5 inches.

10. The light fixture of claim 1, wherein the power circuitry comprises a transformer.

* * * * *